(12) United States Patent  (10) Patent No.: US 8,929,192 B2
Kainulainen et al.  (45) Date of Patent:  Jan. 6, 2015

(54) METHOD, APPARATUS, AND COMPUTER PROGRAM PRODUCT FOR SHORT-RANGE COMMUNICATION BASED DIRECTION FINDING

(75) Inventors: Antti Kainulainen, Espoo (FI); Juha Salokannel, Tampere (FI)

(73) Assignee: Nokia Corporation, Espoo (FI)

( * ) Notice: Subject to any disclaimer, the term of this patent is extended or adjusted under 35 U.S.C. 154(b) by 120 days.

(21) Appl. No.: 13/357,781

(22) Filed: Jan. 25, 2012

(65) Prior Publication Data

US 2013/0188538 A1 Jul. 25, 2013

(51) Int. Cl.
*G01S 11/04* (2006.01)
*G01S 5/02* (2010.01)
*G01S 1/08* (2006.01)
*H04W 4/02* (2009.01)
*H04H 20/02* (2008.01)
*H04L 12/02* (2006.01)

(52) U.S. Cl.
USPC ........... 370/203; 370/252; 370/310; 370/390; 370/392; 370/913; 701/300; 701/408; 342/147; 342/417

(58) Field of Classification Search
CPC ........................................................ G01S 1/08
USPC .......... 370/203, 229, 235, 236, 351, 389, 912
See application file for complete search history.

(56) References Cited

U.S. PATENT DOCUMENTS

| 8,649,800 | B2 * | 2/2014 | Kalliola et al. | ........... 455/456.1 |
| 2003/0202468 | A1 * | 10/2003 | Cain et al. | ...................... 370/229 |
| 2006/0052112 | A1 * | 3/2006 | Baussi et al. | ............... 455/456.1 |
| 2007/0197229 | A1 | 8/2007 | Kalliola et al. | |
| 2008/0182592 | A1 | 7/2008 | Cha et al. | |
| 2008/0297401 | A1 * | 12/2008 | Nishida | ......................... 342/147 |
| 2010/0075603 | A1 | 3/2010 | Newton et al. | |
| 2010/0302102 | A1 | 12/2010 | Desai et al. | |
| 2011/0319020 | A1 * | 12/2011 | Desai et al. | .................. 455/41.2 |
| 2012/0178471 | A1 * | 7/2012 | Kainulainen et al. | ....... 455/456.1 |
| 2012/0257604 | A1 * | 10/2012 | Honkanen et al. | ............ 370/338 |
| 2012/0258669 | A1 * | 10/2012 | Honkanen et al. | ......... 455/67.11 |
| 2012/0289241 | A1 * | 11/2012 | Kalliola et al. | ............ 455/456.1 |
| 2013/0335272 | A1 * | 12/2013 | Belloni et al. | ................. 342/451 |
| 2014/0194141 | A1 * | 7/2014 | Ranki et al. | ................. 455/456.1 |

OTHER PUBLICATIONS

Bluetooth Specification Version 4.0 [vol. 1], Chapter 5, "Security Overview", Jun. 30, 2010, pp. 85-88.
International Search Report for International Application No. PCT/IB2013/050627, mailed Jun. 11, 2013.
Bluetooth Specification Covered Core Package version 4.0; Current Master TOC; Publication date Jun. 30, 2010; pp. 1-138.
Bluetooth Core Specification Addendum 1; Adoption Date: Jun. 26, 2008; pp. 1-176.

(Continued)

*Primary Examiner* — Omar Ghowrwal
(74) *Attorney, Agent, or Firm* — Locke Lord LLP

(57) ABSTRACT

Method, apparatus, and computer program product example embodiments provide short-range communication based direction finding. According to an example embodiment of the invention, a method comprises transmitting by a target device, information in one or more advertising packets, including preferences of the target device for using data signing associated with direction finding; and receiving by the target device from a tracker device, one or more direction finding request packets including a request for data signing corresponding with the target device preferences.

12 Claims, 19 Drawing Sheets

(56) References Cited

OTHER PUBLICATIONS

JH Song, et al; "The AES-CMAC Algorithm", RFC-4493; Jun. 2006, pp. 1-19.
D. Eastlake, 3rd, et al; "Randomness Requirements for Security", RFC 4086; Jun. 2005, pp. 1-48.
A. Freier, et al; "The Secure Sockets Layer" (SSL) Protocol Version 3.0; SSL (Secure Socket Layer), RFC-6101, Aug. 2011, pp. 1-67.
Bluetooth Core Specification, Version 4.0; vol. 2, Part H, Bluetooth Security Specification; Jun. 30, 2010, pp. 1056 -1112.
Bluetooth Core Specification, Version 4.0, vol. 6; Low Energy Controller; Jun. 30, 2010, pp. 98-124.
IEEE 802.11 Standard—2007; Part 11:Wireless LAN Medium Access Control (MAC) and Physical Layer (PHY) Specifications, Jun. 12, 2007, pp. 36-250.
Bluetooth Core Specification; Version 4.0, Generic Attribute Profile (GATT), vol. 3, Part G; Jun. 30, 2010; pp. 519-592.
WUSB "Wireless Universal Serial Bus Specification"; Revision 1.1, Chapter 6, Sep. 9, 2010; pp. 130-147.
UHF, RFID "MIT Auto-ID Center Protocol Specification for 900 MHz RFID Tag" Feb. 23, 2003.
UWB, "High Rate Ultra Wideband PHY and MAC Standard", ECMA-368, 3rd Edition, Chapter 18 Security, Dec. 2008, pp. 241 to 254.
Patrick Kinney, "ZigBee Technology: Wireless Control that Simply Works", IEEE 802.15.4 Task Group, Communications Design Conference, Oct. 2, 2003.
ETSI-GSM Technical Specification, European digital cellular telecommunication system (phase 1), Security-Related Network Functions, GSM 3.20, Version 3.3.2, 1992.
TDMA—Bluetooth Core Specification, Version 4.0, Architecture, vol. 1, Chapter 1.2, Overview of Bluetooth Low Energy Operation, Jun. 30, 2010.
FDMA—Bluetooth Core Specification, Version 4.0, Architecture, vol. 1, Chapter 1.2, Overview of Bluetooth Low Energy Operation, Jun. 30, 2010. i vol. 1, Chapter 1.2, Overview of Bluetooth Low Energy Operation, Jun. 30, 2010.

* cited by examiner

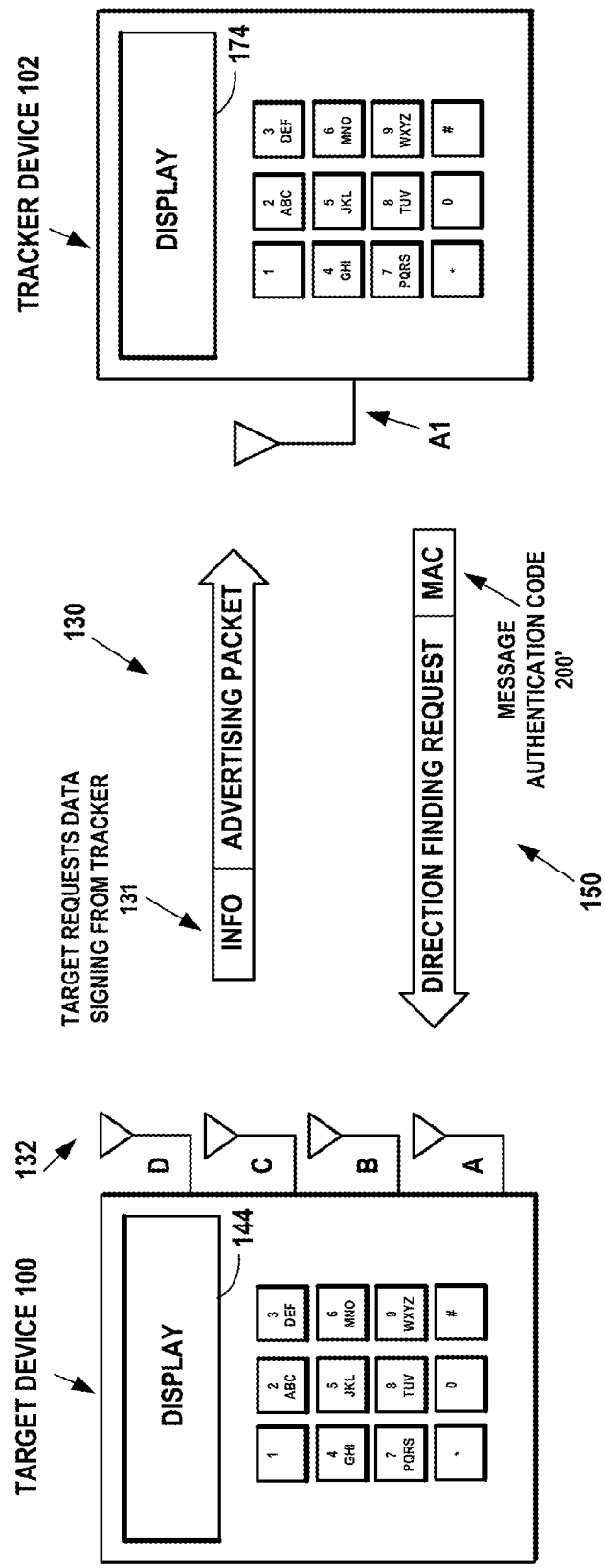

ANGLE OF DEPARTURE (AoD) ESTIMATION

ANGLE OF DEPARTURE (AoD) ESTIMATION

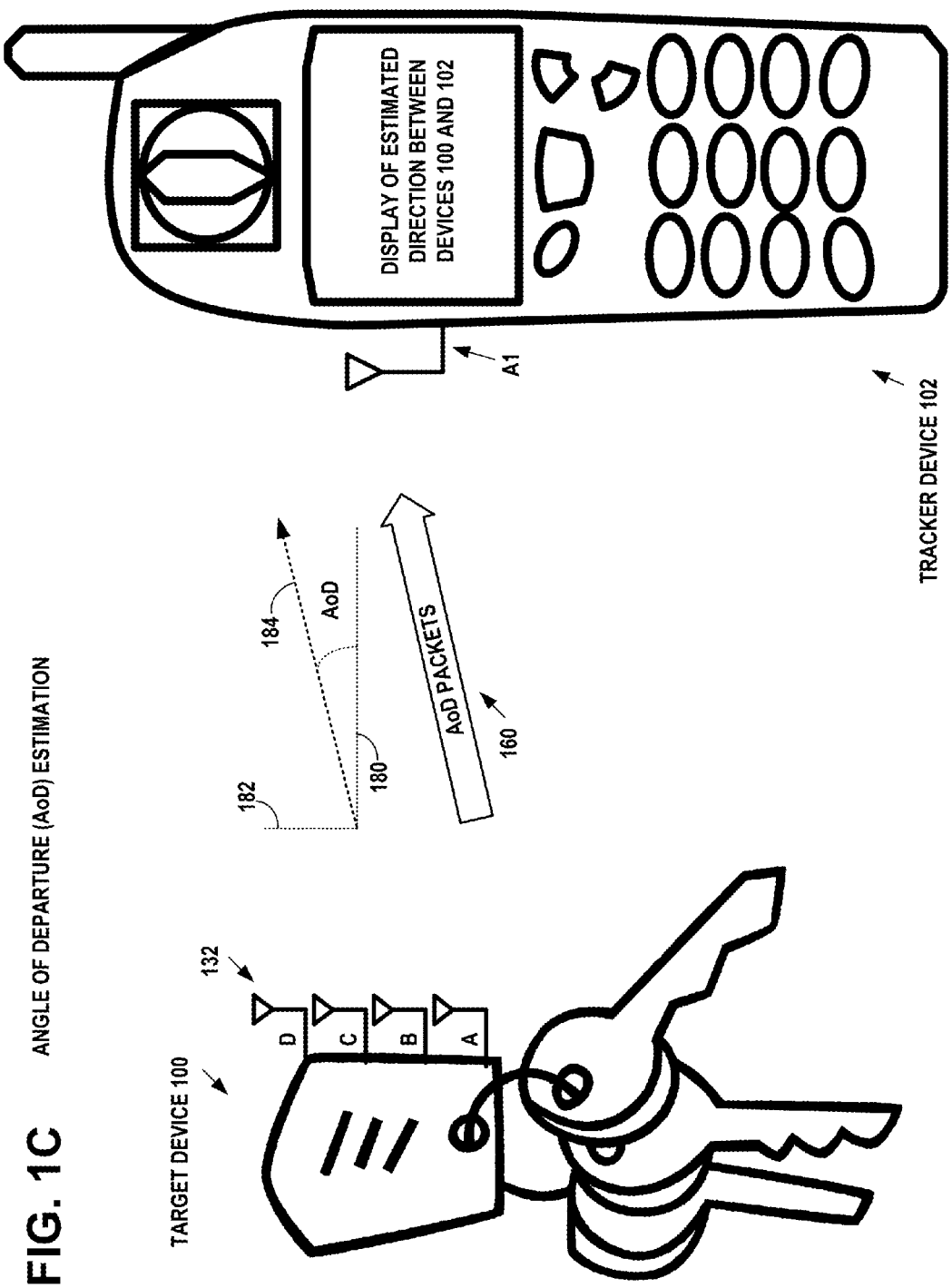

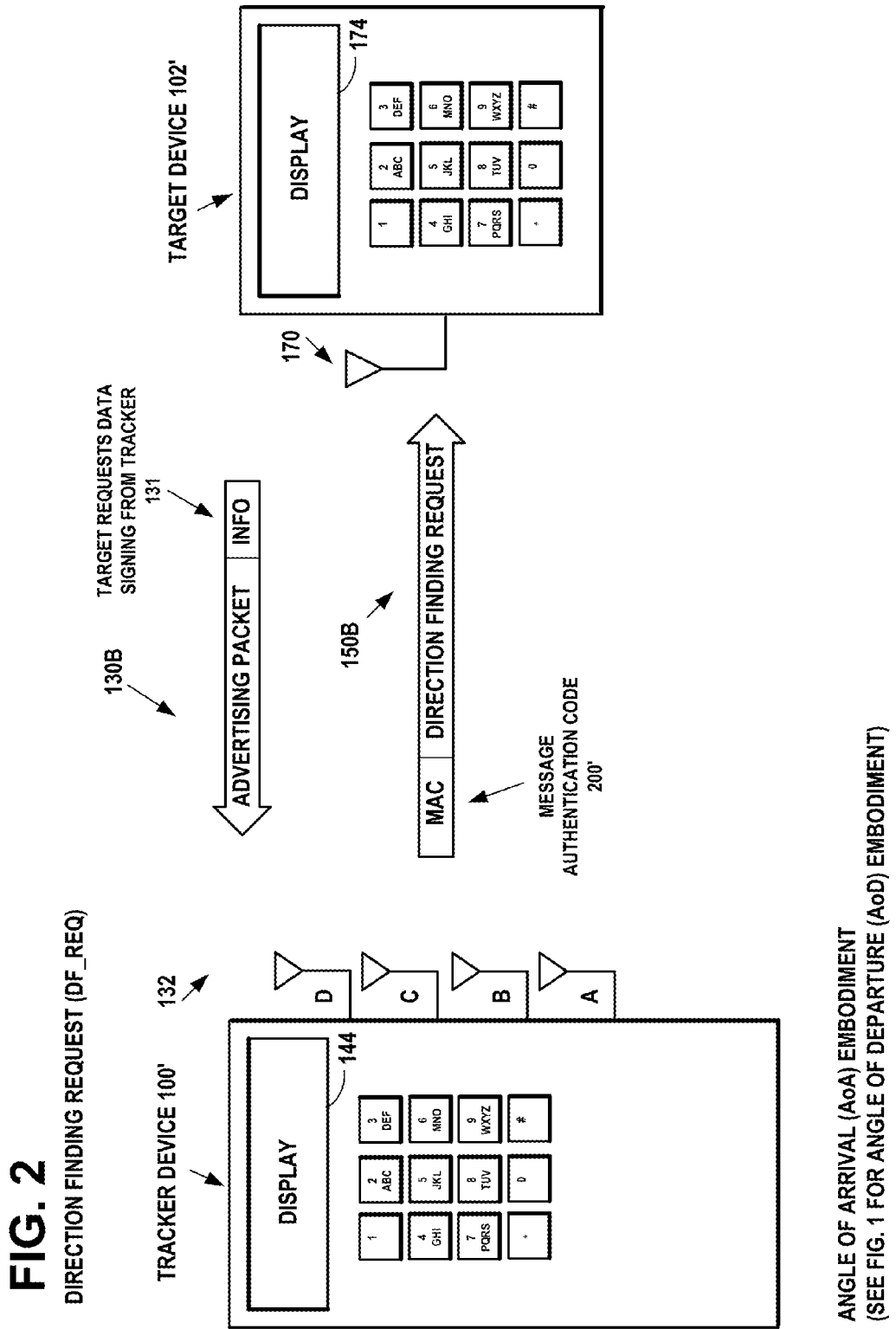

ANGLE OF ARRIVAL (AoA) ESTIMATION

ANGLE OF ARRIVAL (AoA) ESTIMATION

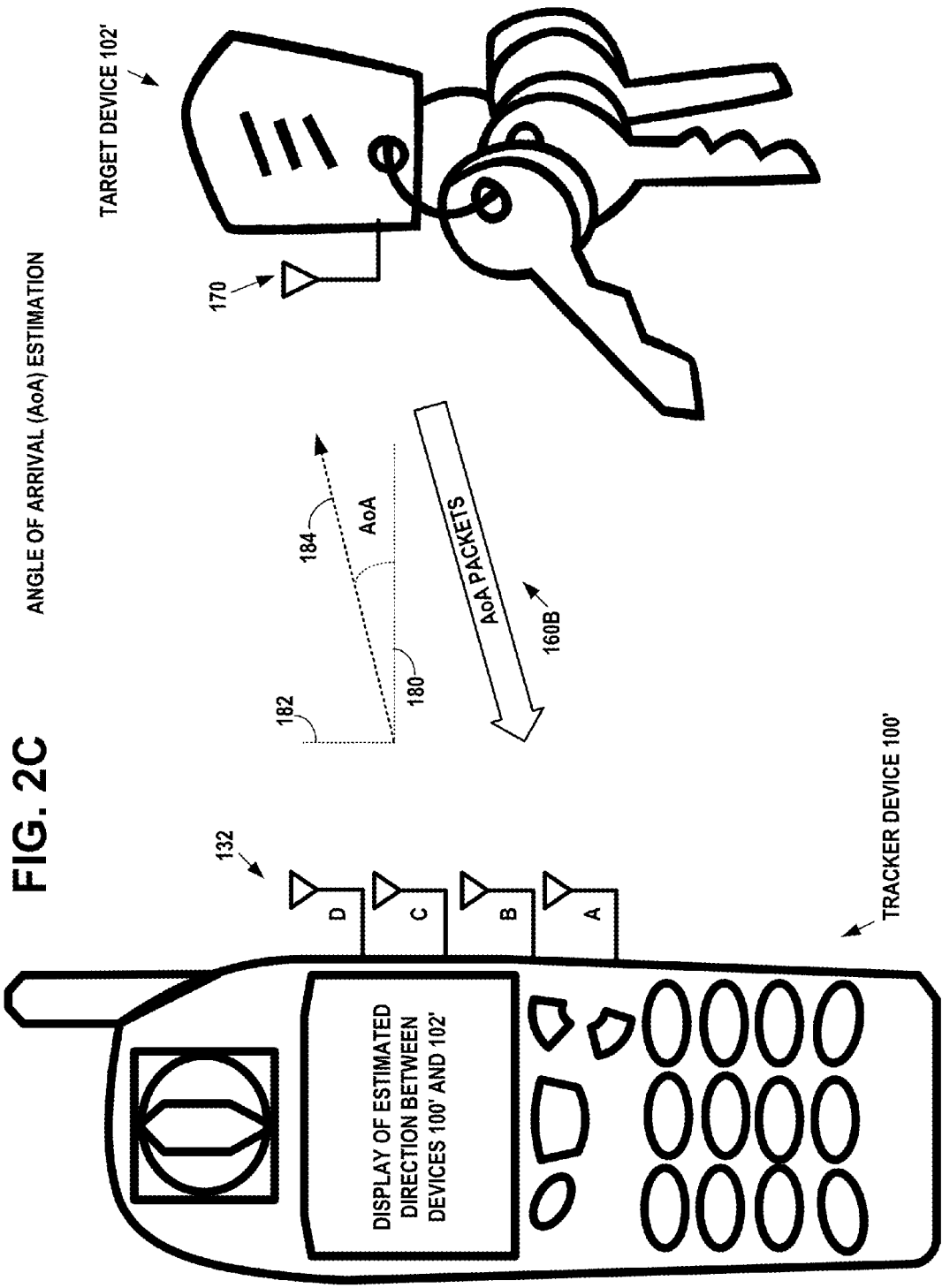

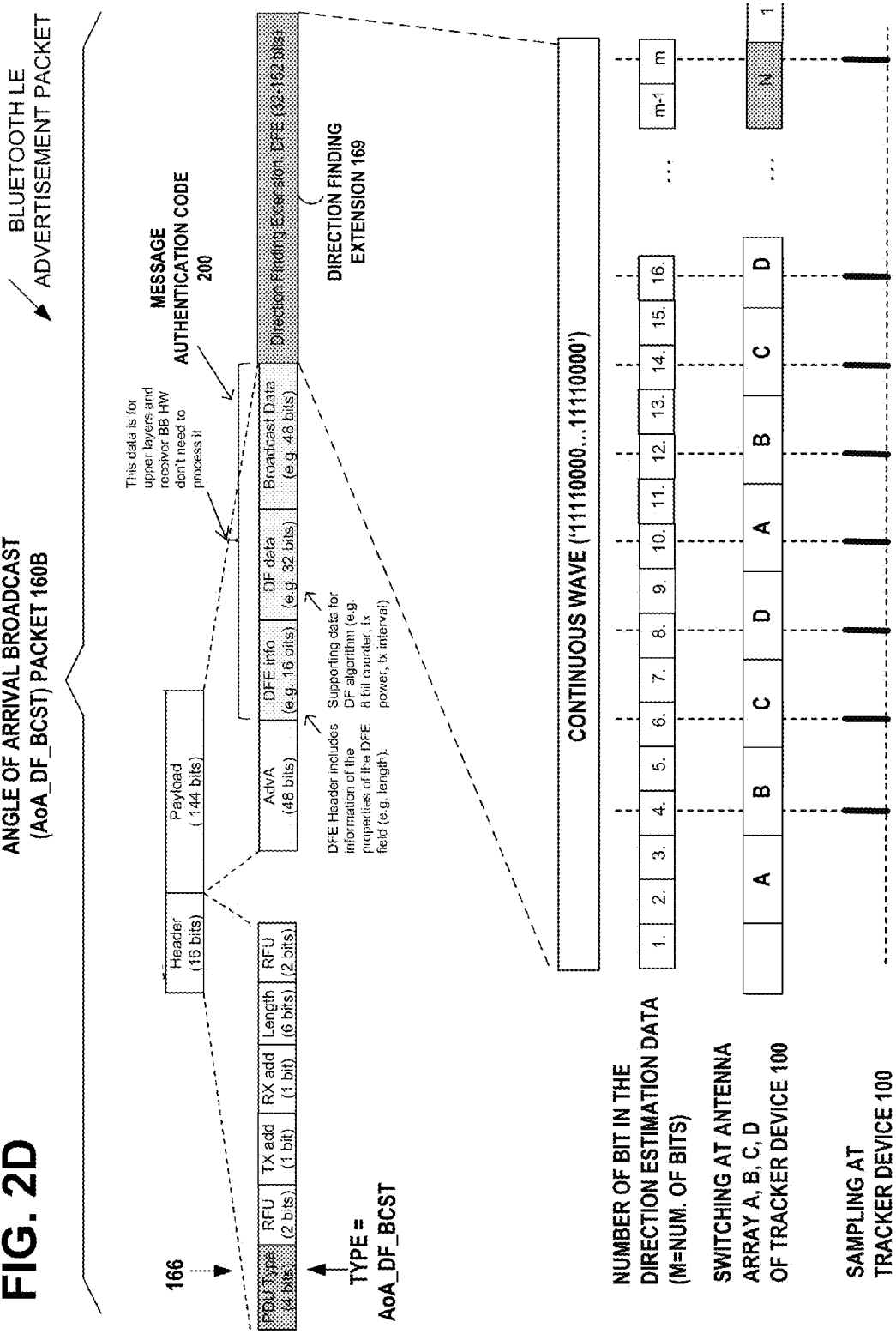

FIG. 6A

PROCESS IN TARGET DEVICE 100

320

STEP 322: TRANSMITTING BY A TARGET DEVICE, INFORMATION IN ONE OR MORE ADVERTISING PACKETS, INCLUDING PREFERENCES OF THE TARGET DEVICE FOR USING DATA SIGNING ASSOCIATED WITH DIRECTION FINDING; AND

STEP 324: RECEIVING BY THE TARGET DEVICE FROM A TRACKER DEVICE, ONE OR MORE DIRECTION FINDING REQUEST PACKETS INCLUDING A REQUEST FOR DATA SIGNING CORRESPONDING WITH THE TARGET DEVICE PREFERENCES.

FIG. 6B

PROCESS IN TRACKER DEVICE 102

620 →

STEP 622: RECEIVING BY A TRACKER DEVICE, INFORMATION IN ONE OR MORE ADVERTISING PACKETS FROM A TARGET DEVICE, INCLUDING PREFERENCES OF THE TARGET DEVICE FOR DATA SIGNING ASSOCIATED WITH DIRECTION FINDING; AND

STEP 624: TRANSMITTING BY THE TRACKER DEVICE TO THE TARGET DEVICE, ONE OR MORE DIRECTION FINDING REQUEST PACKETS INCLUDING A REQUEST FOR DATA SIGNING CORRESPONDING WITH THE TARGET DEVICE PREFERENCES.

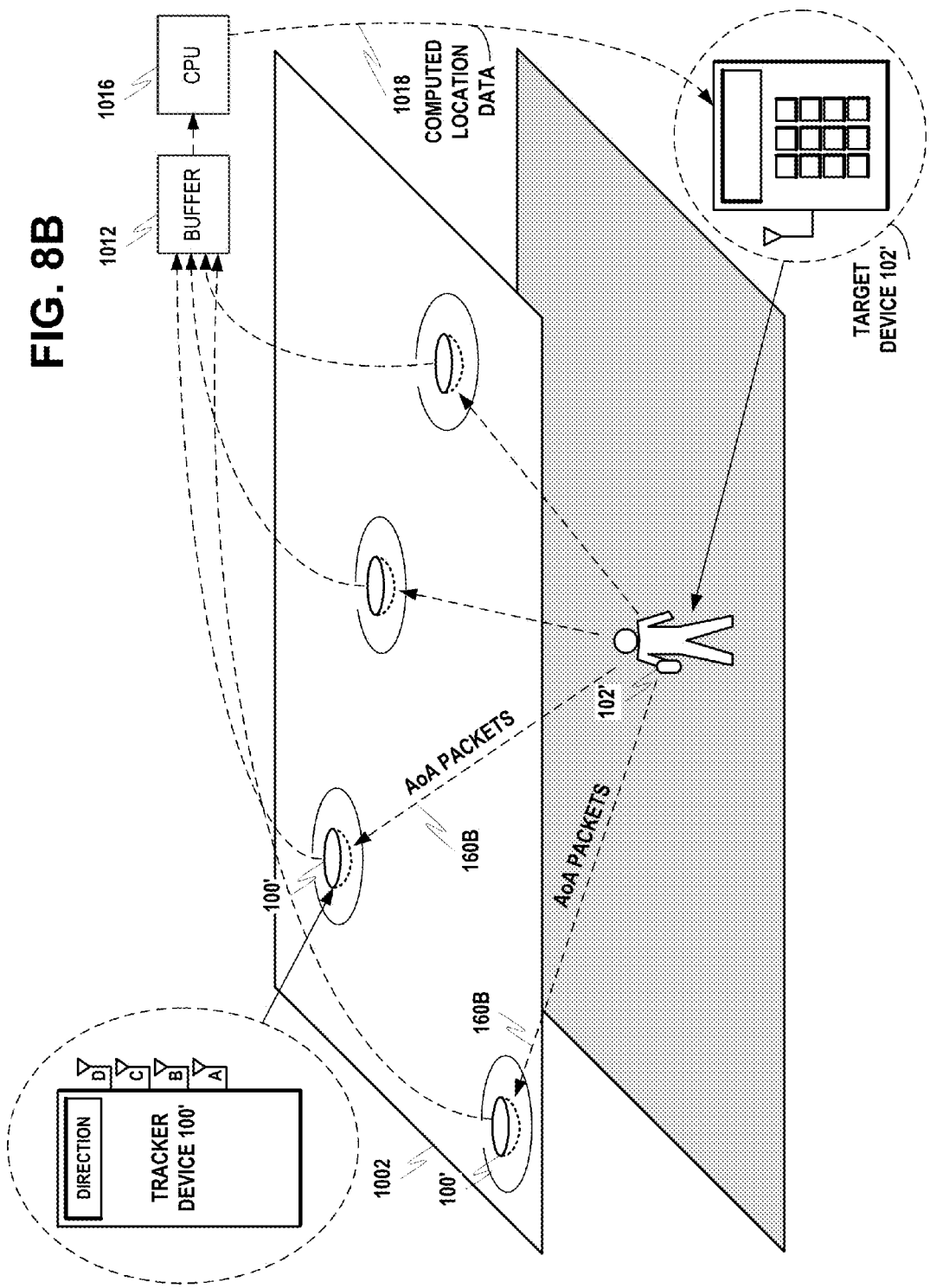

METHOD, APPARATUS, AND COMPUTER PROGRAM PRODUCT FOR SHORT-RANGE COMMUNICATION BASED DIRECTION FINDING

FIELD

The field of the invention relates to wireless short-range communication and more particularly to short-range communication based direction finding.

BACKGROUND

Modern society has adopted, and is becoming reliant upon, wireless communication devices for various purposes, such as connecting users of the wireless communication devices with other users. Wireless communication devices can vary from battery powered handheld devices to stationary household and/or commercial devices utilizing an electrical network as a power source. Due to rapid development of the wireless communication devices, a number of areas capable of enabling entirely new types of communication applications have emerged.

Cellular networks facilitate communication over large geographic areas. These network technologies have commonly been divided by generations, starting in the late 1970s to early 1980s with first generation (1G) analog cellular telephones that provided baseline voice communications, to modern digital cellular telephones. GSM is an example of a widely employed 2G digital cellular network communicating in the 900 MHZ/1.8 GHZ bands in Europe and at 850 MHz and 1.9 GHZ in the United States. While long-range communication networks, like GSM, are a well-accepted means for transmitting and receiving data, due to cost, traffic and legislative concerns, these networks may not be appropriate for all data applications.

Short-range communication technologies provide communication solutions that avoid some of the problems seen in large cellular networks. Bluetooth™ is an example of a short-range wireless technology quickly gaining acceptance in the marketplace. In addition to Bluetooth™ other popular short-range communication technologies include Bluetooth™ Low Energy, IEEE 802.11 wireless local area network (WLAN), Wireless USB (WUSB), Ultra Wide-band (UWB), ZigBee (IEEE 802.15.4, IEEE 802.15.4a), and ultra-high frequency radio frequency identification (UHF RFID) technologies. All of these wireless communication technologies have features and advantages that make them appropriate for various applications.

Perhaps the best-known example of wireless personal area network (PAN) technology is the Bluetooth™ Standard, which operates in the 2.4 GHz ISM band. Bluetooth is a short-range radio network, originally intended as a cable replacement. Bluetooth Technical Specifications are published by the Bluetooth SIG, Inc. Bluetooth Specification version 2.0+EDR, published Oct. 15, 2004 has the original functional characteristics of the first version Bluetooth Basic Rate (BR) and adds the Enhanced Data Rate (EDR) feature. Bluetooth Specification version 2.1+EDR, published Jul. 26, 2007 for Basic Rate/Enhanced Data Rate (BR/EDR), added definitions for new features: Encryption Pause Resume, Erroneous Data reporting, Extended Inquiry Response, Link Supervision Timeout Event, Packet Boundary Flag, Secure Simple Pairing, Sniff Subrating. Bluetooth Specification version 3.0+HS, published Apr. 21, 2009, updated the standard to integrate the Alternate MAC/PHY and Unicast Connectionless Data features.

On Apr. 20, 2009, Bluetooth SIG presented the new Bluetooth™ Low Energy protocol. Bluetooth Low Energy (LE) is a communication protocol directed to optimize power consumption of devices while being connected to other devices. The Bluetooth Low Energy packets include a preamble used for radio synchronization, an access address used for physical link identification, a shorter protocol data unit (PDU) to carry the payload data and the PDU header information, and a cyclic redundancy code (CRC) to ensure correctness of the data in the PDU.

On Jun. 30, 2010, the Bluetooth™ SIG published the Bluetooth Core Specification, Version 4.0 that includes the Bluetooth Low Energy (LE) protocol for products that require lower power consumption, lower complexity, and lower cost than would be possible using the BR/EDR protocol. Bluetooth LE is designed for applications requiring lower data rates and shorter duty cycles, with a very-low power idle mode, a simple device discovery, and short data packets. Bluetooth LE devices employ a star topology, where one device serves as a master for a plurality of slave devices, the master dictating connection timing by establishing the start time of the first connection event and the slave devices transmitting packets only to the master upon receiving a packet from the master. According to Bluetooth LE communication protocol all connections are point-to-point connections between two devices (the master and the slave).

SUMMARY

Method, apparatus, and computer program product example embodiments provide short-range communication based direction finding.

In an example embodiment of the invention, a method comprises:

transmitting by a target device, information in one or more advertising packets, including preferences of the target device for using data signing associated with direction finding; and receiving by the target device from a tracker device, one or more direction finding request packets including a request for data signing corresponding with the target device preferences.

In an example embodiment of the invention, a method comprises:

generating by the target device, a data signature of the target device; and transmitting by the target device, one or more direction finding packets to the tracker device, including the data signature.

In an example embodiment of the invention, a method comprises:

including in the transmitted advertising packet, a request for data signing by tracker devices; and receiving by the target device from the tracker device, a data signature of the tracker device included in at least one of the one or more direction finding request packets.

In an example embodiment of the invention, a method comprises:

generating by the target device, a data signature of the target device; and transmitting by the target device, at least one of angle of departure information and angle of arrival information in one or more direction finding packets, including the data signature.

In an example embodiment of the invention, a method comprises:

wherein the one or more advertising packets are Bluetooth LE advertising packets.

In an example embodiment of the invention, an apparatus comprises:

at least one processor;

at least one memory including computer program code;

the at least one memory and the computer program code configured to, with the at least one processor, cause the apparatus at least to:

transmit information in one or more advertising packets, including preferences of the target device for using data signing associated with direction finding; and receive from a tracker device, one or more direction finding request packets including a request for data signing corresponding with the target device preferences.

In an example embodiment of the invention, a computer program product comprising computer executable program code recorded on a computer readable non-transitory storage medium, the computer executable program code when executed, performing the steps comprising:

transmitting by a target device, information in one or more advertising packets, including preferences of the target device for using data signing associated with direction finding; and receiving by the target device from a tracker device, one or more direction finding request packets including a request for data signing corresponding with the target device preferences.

In an example embodiment of the invention, a method comprises:

16. A method, comprising:

receiving by a tracker device, information in one or more advertising packets from a target device, including preferences of the target device for data signing associated with direction finding; and transmitting by the tracker device to the target device, one or more direction finding request packets including a request for data signing corresponding with the target device preferences.

In an example embodiment of the invention, a method comprises:

receiving by the tracker device, one or more direction finding packets from the target device, including a data signature of the target device.

In an example embodiment of the invention, a method comprises:

receiving in the transmitted one or more advertising packet, a request for data signing by tracker devices; and transmitting by the tracker device to the target device, a data signature of the tracker device included in at least one of the one or more direction finding request packets.

In an example embodiment of the invention, a method comprises:

receiving by the tracker device, at least one of angle of departure information and angle of arrival information in one or more direction finding packets from the target device, including a data signature of the target device.

In an example embodiment of the invention, a method comprises:

wherein the one or more advertising packets are Bluetooth LE advertising packets.

In an example embodiment of the invention, an apparatus comprises:

at least one processor;

at least one memory including computer program code;

the at least one memory and the computer program code configured to, with the at least one processor, cause the apparatus at least to:

receive information in one or more advertising packets from a target device, including preferences of the target device for data signing associated with direction finding; and transmit to the target device, one or more direction finding request packets including a request for data signing corresponding with the target device preferences.

In an example embodiment of the invention, a computer program product comprising computer executable program code recorded on a computer readable non-transitory storage medium, the computer executable program code when executed, performing the steps comprising:

receiving by a tracker device, information in one or more advertising packets from a target device, including preferences of the target device for data signing associated with direction finding; and transmitting by the tracker device to the target device, one or more direction finding request packets including a request for data signing corresponding with the target device preferences.

The example embodiments of the invention provide short-range communication based direction finding.

DESCRIPTION OF THE FIGURES

FIG. 1 illustrates an example embodiment of the invention, depicting an example network diagram showing the target device broadcasting an advertising packet that may request data signing from tracker devices and a tracker device sending a direction finding request packet to the target device in an angle of departure (AoD) embodiment, and, if it was requested, using the Bluetooth LE packet signing algorithm to include its own message identification code in the direction finding request packet to verify the identity of the tracker device, in accordance with at least one embodiment of the present invention.

FIG. 1C illustrates an example embodiment of the invention shown in FIGS. 1A and 1B, wherein the target device is a key fob that transmits angle of departure (AoD) packets that may include a message authentication code, to the tracker device that is a mobile wireless telephone, to perform angle of departure (AoD) estimation of the angle between the two wireless devices, in accordance with at least one embodiment of the present invention.

FIG. 2 illustrates an example embodiment of the invention, depicting an example network diagram showing the target device in an angle of arrival (AoA) embodiment, broadcasting an advertising packet that may request data signing from tracker devices and a tracker device sending a direction finding request packet to the target device and, if it was requested, using the Bluetooth LE packet signing algorithm to include its own message identification code in the direction finding request packet to verify the identity of the tracker device, in accordance with at least one embodiment of the present invention.

FIG. 2C illustrates an example embodiment of the invention shown in FIGS. 2A and 22B, wherein the target device is a key fob that transmits angle of arrival (AoA) packets that may include a message authentication code, to the tracker device that is a mobile wireless telephone, the tracker device 100' determining an angle of arrival using an antenna array, in accordance with at least one embodiment of the present invention.

FIG. 2D illustrates an example embodiment of the invention, depicting an example of angle of arrival (AoA) estimation, showing an example AoA packet (AoA_DF_BCST) with a message authentication code field and how the bits in the reference pattern from the angle of arrival packet are transmitted by the single antenna at the target device and received by the antenna array and sampled at the tracker device, in accordance with at least one embodiment of the present invention.

FIG. 6A illustrates an example embodiment of the invention, depicting an example flow diagram of an example method, from the point of view of the target device, in accordance with at least one embodiment of the present invention.

FIG. 6B illustrates an example embodiment of the invention, depicting an example flow diagram of an example method, from the point of view of the tracker device, in accordance with at least one embodiment of the present invention.

FIG. 8B illustrates an example embodiment of the invention, wherein the network of ceiling beacons that incorporate angle of arrival (AoA) estimation, as shown in FIG. 8A. The two dimensional or three dimensional location of the target device held by the user, as computed by the CPU, is fed back to the target device 102' held by the user, for purposes, such as displaying navigational information, in accordance with at least one embodiment of the present invention.

DISCUSSION OF EXAMPLE EMBODIMENTS OF THE INVENTION

Figure 1A:
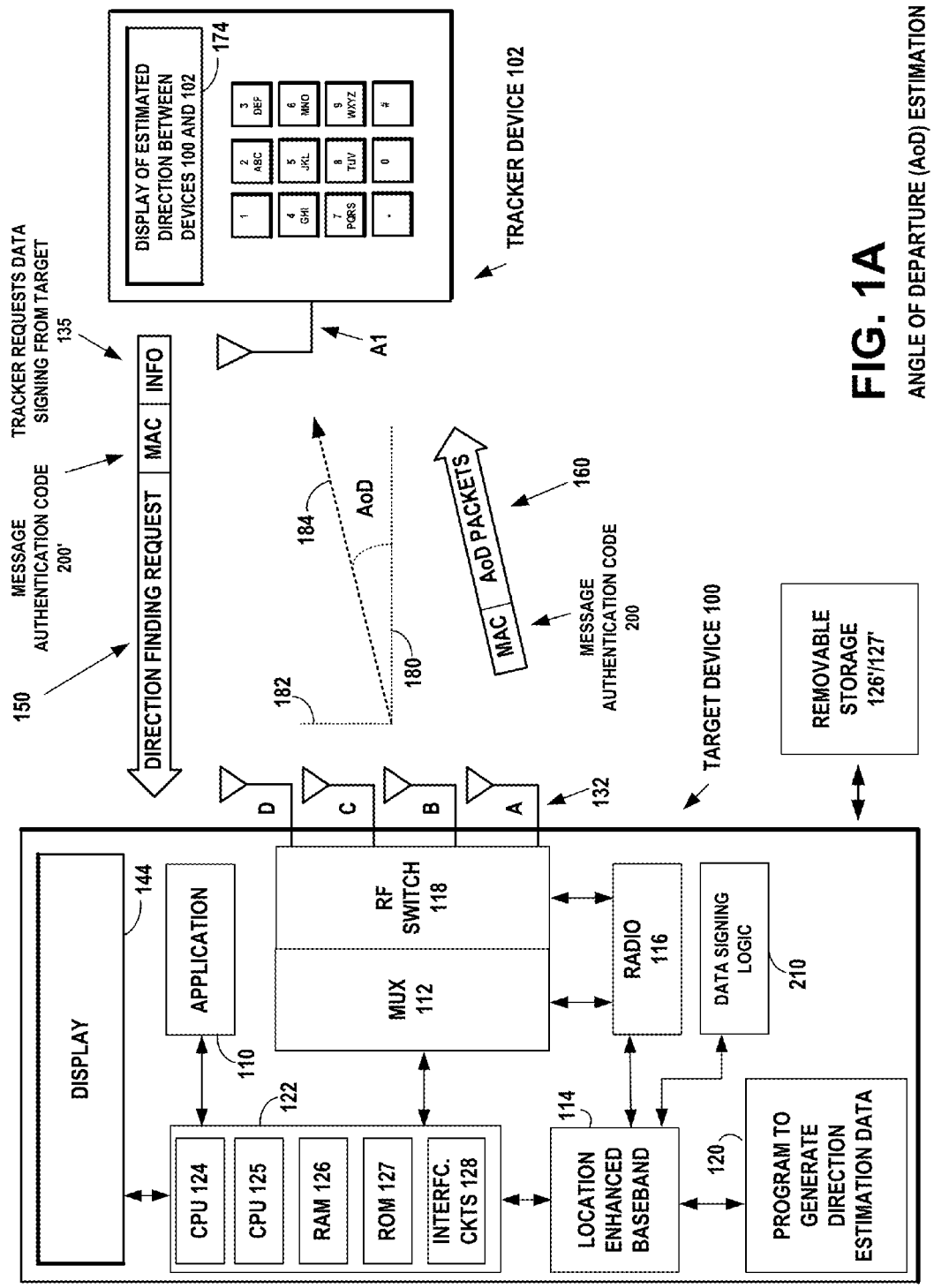
FIG. 1A illustrates an example embodiment of the invention, depicting an example network diagram showing angle of departure (AoD) estimation being used to estimate a direction between wireless devices, the target device including data signing logic, wherein a target device transmits angle of departure packets that may include a message authentication code, to a tracker device that has single antenna, in accordance with at least one embodiment of the present invention.

Wireless security has become an important aspect of the overall security for wireless direction finding systems. Wireless devices having direction finding features may be vulnerable to attack by remotely located, high-power transmitters or directive antennas that increase the received signal level beyond a minimum distance from the receiver. Security attacks may be attempted by remotely located transmitters using advanced predictive algorithms that allow shorter processing times and therefore longer propagation delays for the response signals. In some of the direction finding related use cases (especially asset tracking), privacy methods are required. One of the requirements is that the tracker should be sure that no-one is faking, but it should get the direction finding messages from a proper device. On the other hand, in asset tracking the target devices should only send direction finding messages by request of proper tracker devices.

This section is organized into the following topics:
I. Bluetooth™ Low Energy (LE) Technology
II. Security Features of Bluetooth™ LE
III. Direction Estimation
  A. Angle of Departure (AoD),
  B. Angle of Arrival (AoA)
IV. Short-Range Communication Based Direction Finding.

I. Bluetooth™ Low Energy (LE) Technology

The Bluetooth Core Specification, Version 4.0 includes the Bluetooth LE protocol for products that require lower power consumption, lower complexity, and lower cost than would be possible using the BR/EDR protocol. Bluetooth LE is designed for applications requiring lower data rates and shorter duty cycles, with a very-low power idle mode, a simple device discovery, and short data packets. Bluetooth LE devices may employ a star topology, where one device serves as a master for a plurality of slave devices, the master dictating connection timing by establishing the start time of the first connection event and the slave devices transmitting packets only to the master upon receiving a packet from the master. According to Bluetooth LE communication protocol all connections are point-to-point connections between two devices (the master and the slave).

The Bluetooth LE protocol allows a star network topology in connections, where one device serves as a master for a plurality of slave devices. The master device dictates the connection timing and communication operations of the one or more slave devices. Bluetooth LE communicates over a total of 40 RF channels, each having a bandwidth of 2 MHz. Data communication between Bluetooth LE devices occurs in 37 pre-specified data channels, of the 40 RF channels. All data connection transmissions occur in connection events wherein a point-to-point connection is established between the master device and a slave device. In the Bluetooth LE protocol, a slave device provides data through Bluetooth LE communication to the master device to which it is connected. The remaining 3 channels, of the 40 RF channels, are advertising channels used by devices to advertise their existence and capabilities. The Bluetooth LE protocol defines a unidirectional connectionless broadcast mode on the advertising channels.

The Link Layer provides a state machine with the following five states: Standby State, Advertising State, Scanning State, Initiating State, and Connection State. The Link Layer state machine allows only one state to be active at a time. The Link Layer in the Standby State does not transmit or receive any packets and can be entered from any other state. The Link Layer in the Advertising State will be transmitting advertising channel packets and possibly listening to and responding to responses triggered by these advertising channel packets. A device in the Advertising State is known as an advertiser. The Advertising State can be entered from the Standby State. The Link Layer in the Scanning State will be listening for advertising channel packets from devices that are advertising. A device in the Scanning State is known as a scanner. The Scanning State can be entered from the Standby State. The Link Layer in the Initiating State will be listening for advertising channel packets from a specific device and responding to these packets to initiate a connection with that specific device. A device in the Initiating State is known as an initiator. The Initiating State can be entered from the Standby State. The Connection State of the Link Layer may be entered either from the Initiating State or the Advertising State. A device in the Connection State is known as being in a connection over a data channel. Within the Connection State, two roles are defined: the Master Role and the Slave Role. When a device in the Initiating State, enters the Connection State, it is in the Master Role, it exchanges data packets with a slave device in a data channel, and it defines the timings of transmissions. When a device in the Advertising State, enters the Connection State, it is in the Slave Role and exchanges data packets with a master device in a data channel, wherein the master device defines the timings of transmissions.

The Bluetooth LE radio operates in the unlicensed 2.4 GHz ISM band, in the same manner as does the Basic Rate/Enhanced Data Rate (BR/EDR) radio. Bluetooth LE supports very short data packets, from 8 octets to a maximum of 27 octets, giving it a low duty cycle. Bluetooth LE employs a frequency hopping transceiver with many frequency hopping spread spectrum (FHSS) carriers, with a bit rate of 1 Megabit per second (Mb/s).

Bluetooth LE employs two multiple access schemes: Frequency division multiple access (FDMA) and time division multiple access (TDMA). Forty (40) physical channels, separated by 2 MHz, are used in the FDMA scheme. Three (3) are used as advertising channels and 37 are used as data channels. A TDMA based polling scheme is used in which one device transmits a packet at a predetermined time and a corresponding device responds with a packet after a predetermined interval.

The physical channel is sub-divided into time units known as events. Data is transmitted between Bluetooth LE devices in packets that are positioned in these events. There are two types of events: Advertising and Connection events.

Devices that transmit advertising packets on the advertising Physical Layer (PHY) channels are referred to as advertisers. Devices that receive advertising on the advertising channels without the intention to connect to the advertising device are referred to as scanners. Devices that form a connection to another device by listening for connectable advertising packets, are referred to as initiators. Transmissions on the advertising PHY channels occur in advertising events.

In the Bluetooth Core Specification, Version 4.0, there are four advertising event types: connectable undirected advertising (ADV_IND), connectable directed advertising (ADV_DIRECT_IND), scannable undirected advertising (ADV_SCAN_IND), and non-connectable undirected advertising (ADV_NONCONN_IND). At the start of each advertising event, the advertiser sends an advertising packet corresponding to the advertising event type. The scanner device, also referred to as the initiator device, that receives the advertising packet, may make a connect request (CONNECT_REQ) to the advertiser device on the same advertising PHY channel. The CONNECT_REQ request includes fields for access address AA, CRC, WinSize, WinOffset, Interval, Latency, Timeout, ChannelMap, Hop count, and sleep clock accuracy SCA. When the advertiser device accepts the CONNECT_REQ request, a point-to-point connection results between the scanner/initiator device that becomes the master device, and the advertiser device that becomes the slave device in a piconet. The master and the slave devices know at what time and in which frequency the connection is in operation. The data channel changes between every connection event and the start of connection events are spaced regularly with the connection interval that is provided in the CONNECT_REQ packet.

In the connectable undirected advertising (ADV_IND) channel packet, the ADV_IND PDU has a payload field containing AdvA and AdvData fields. The AdvA field contains the advertiser's public or random device address and the AdvData field may contain Advertising data from the advertiser's host. The PDU may be used in connectable undirected advertising events.

In the connectable directed advertising (ADV_DIRECT_IND) channel packet, the ADV_DIRECT_IND PDU has the payload field containing AdvA and InitA fields. The AdvA field contains the advertiser's public or random device address. The InitA field is the address of the device to which this PDU is addressed. The InitA field may contain the initiator's public or random device address. The PDU may be used in connectable directed advertising events. This packet may not contain any host data.

In a non-connectable undirected event type advertising channel packet, ADV_NONCONN_IND, a scanner device is allowed to receive information in the advertising channel packet, but scanner devices are not allowed to transmit anything in the advertising channels upon receiving the ADV_NONCONN_IND advertising channel packets. When the non-connectable undirected event type is used, non-connectable advertising indications ADV_NONCONN_IND packets are sent by the Link Layer. The non-connectable undirected event type allows a scanner to receive information contained in the ADV_NONCONN_IND from the advertiser. The advertiser may either move to the next used advertising channel index or close the advertising event after each ADV_NONCONN_IND that is sent.

In the scannable undirected advertising (ADV_SCAN_IND) channel packet, the ADV_SCAN_IND PDU has the payload field containing AdvA and AdvData fields. The AdvA field contains the advertiser's public or random device address. The PDU may be used in scannable undirected advertising events. The AdvData field may contain Advertising Data from the advertiser's host.

In the Bluetooth Core Specification, Version 4.0, if the advertiser is using a connectable advertising event, a scanner/initiator may make a connection request using the same advertising PHY channel on which it received the connectable advertising packet. The advertising event is ended and connection events begin if the advertiser receives and accepts the request for a connection to be initiated. Once a connection is established, the scanner/initiator becomes the master device in a piconet and the advertising device becomes the slave device. Within a connection event, the master and slave alternate sending data packets using the same data PHY channel.

Example non-limited use cases for Bluetooth LE technology include sports and fitness, security and proximity and smart energy. Bluetooth LE technology is designed for devices to have a battery life of up to one year such as those powered by coin-cell batteries. These types of devices include watches that will utilize Bluetooth LE technology to display Caller ID information and sports sensors that will be utilized to monitor the wearer's heart rate during exercise. The Medical Devices Working Group of the Bluetooth SIG is also creating a medical devices profile and associated protocols to enable Bluetooth applications for Bluetooth LE devices.

II. Security Features of Bluetooth™ LE

Bluetooth LE pairing results in the generation of a Long-Term Key (LTK). The LTK is generated using a key transport protocol, where one device determines the LTK and sends it over to the other device during pairing, instead of both devices generating the same key individually.

Bluetooth LE uses Advanced Encryption Standard (AES) Counter with cipher block chaining message authentication code (CBC-MAC), wherein a message authentication code is created from a block cipher. The message may be encrypted with a block cipher algorithm in CBC mode to create a chain of blocks such that each block depends on the proper encryption of the previous block. Counter with CBC-MAC (CCM) mode combines the counter mode of encryption with the CBC-MAC mode of authentication. The counter mode turns a block cipher into a stream cipher and generates the next keystream block by encrypting successive values of a counter. The counter may be any function that produces a sequence that does not to repeat itself.

Bluetooth LE also uses features such as private device addresses and data signing. New cryptographic keys called the Identity Resolving Key (IRK) and Connection Signature Resolving Key (CSRK) support these features, respectively. The IRK is used to resolve public to private device address mapping. This allows a trusted device to determine another device's private device address from a public (random) device address. This security feature provides privacy for a particular device. Previously, a device would be assigned a static address that would be made available during discovery. If that device remained discoverable, its location could be tracked by an adversary. The CSRK is used to verify cryptographically signed data frames from a particular device. This allows a Bluetooth connection to use data signing that provides integrity and authentication to protect the connection instead of data encryption.

The cryptographic keys LTK, IRK, and CSRK may be generated and securely distributed during Bluetooth LE pairing.

In Bluetooth LE security modes, each service may have its own security requirements. Bluetooth LE also specifies that each service request may have its own security requirements as well. A device enforces the service-related security requirements by following the appropriate security mode and level.

Bluetooth LE Security Mode 1 has multiple levels associated with encryption. Level 1 specifies no security, meaning no authentication and no encryption will be initiated. Level 2 requires unauthenticated pairing with encryption. Level 3 requires authenticated pairing with encryption.

Bluetooth LE Security Mode 2 has multiple levels associated with data signing. Data signing provides strong data integrity but not confidentiality. Level 1 requires unauthenticated pairing with data signing. Level 2 requires authenticated pairing with data signing. If a particular service request and the associated service have different security modes and/or levels, the stronger security requirements prevail. For example, if either requires Security Mode 1 Level 3, then the requirements for Security Mode 1 Level 3 are enforced.

Because Security Mode 1 Level 3 requires authenticated pairing and encryption, it is considered the most secure of these modes/levels. Security Mode 1 Level 1 is considered the least secure.

The Bluetooth LE packet signing algorithm is based on the Advanced Encryption Standard (AES) Cipher-based Message Authentication Code (CMAC) described in RFC-4493. AES-CMAC is a keyed hash function based on a symmetric key block cipher. It provides stronger assurance of data integrity than a checksum or an error-detecting code. The verification of a checksum or an error-detecting code detects only accidental modifications of the data, while CMAC is designed to detect intentional, unauthorized modifications of the data, as well as accidental modifications. The Bluetooth LE packet signing algorithm is used by the Generic Attribute Profile (GATT) procedure Write Signed Command. This implementation is self contained, takes as inputs a packet to be signed, a serial number, and the Connection Signature Resolving Key (CSRK), all in network order. Its output is a fully signed datagram for transmission or verification.

The security provided by AES-CMAC is built on the strong cryptographic algorithm AES. However, as is true with any cryptographic algorithm, part of its strength lies in the secret key, K, and the correctness of the algorithm implementation in all of the participating systems. If the secret key is compromised or inappropriately shared, it guarantees neither authentication nor integrity of message at all. The secret key should be generated in a way that meets the pseudo randomness requirement of RFC 4086 and should be kept safe by the entities authorized to use it.

In accordance with an example embodiment of the invention, the Bluetooth LE packet signing algorithm may be used to verify the identity of the sender of a packet. Prior to a communications session, two devices that are authorized to communicate with one another may arrange to share a secret, symmetric key, K, and to share values representing the respective identities of the devices. The values representing the respective identities of the devices may include their respective serial numbers, their respective BT_ADDR address values, or other unique identification values. The sharing of the key K and identification values may take place at a previous time of manufacture of the devices or in a pre-arranged setup of the devices. In accordance with an example embodiment of the invention, a secure exchange procedure, such as Secure Socket Layer (SSL), may be used during the communications session to share the key K and identification values. Then, prior to or during a communications session, each device may sign one or more packets by using the Bluetooth LE packet signing algorithm operating on the device's shared identification value and the shared secret key K, to generate a fully signed datagram that the device sends to the other device for verification. The fully signed datagram will be referred to herein as the message authentication code. In accordance with an example embodiment of the invention, the receiving device verifies the identity of the sending device that sent the packet by using the Bluetooth LE packet signing algorithm operating on the sending device's shared identification value and the shared secret key K, to generate a trial signed datagram. If the trial signed datagram corresponds to the received, fully signed datagram, then the receiving device has verified the identity of the sending device.

III. Direction Estimation

A. Angle of Departure (AoD)

In angle of departure (AoD) direction estimation, a target wireless device includes an array of antennas arranged with a normal axis for transmitting an AoD packet. For a linear antenna array along a linear axis of the target wireless device, a normal axis perpendicular to the linear axis defines a plane with the linear antenna array. The apparent direction of transmission of an AoD packet from the linear antenna array of the target device, as seen from a remote receiving tracker wireless device occupying the plane, may be represented by an observation vector. The angle between the observation vector and the normal axis is defined as the angle of departure (AoD) of the AoD packet as it leaves the antenna array of the target device. In embodiments, the antenna array on the target device may be arranged in a two-dimensional array in a plane and the normal axis is perpendicular to the plane of the antenna array. In this arrangement, the angle of departure (AoD) is similarly defined as the angle between the observation vector and the normal axis to the plane. In embodiments, the antenna array on the target device may be arranged in any arbitrary manner, either in a linear array, a two-dimensional array, or a three dimensional array.

B. Angle of Arrival (AoA)

In angle of arrival (AoA) direction estimation, a tracker wireless device includes an array of antennas arranged with a normal axis. For a linear antenna array along a linear axis of the tracker device, a normal axis perpendicular to the linear axis defines a plane with the linear antenna array. The apparent direction of reception of an AoA packet by the linear antenna array of the tracker device, as seen from a remote transmitting target wireless device occupying the plane, may be represented by an observation vector. The angle between the observation vector and the normal axis is defined as the angle of arrival (AoA) of the signal as it approaches the antenna array of the tracker device. In embodiments, the antenna array of the tracker device may be arranged in a two-dimensional array in a plane and the normal axis is perpendicular to the plane of the antenna array. In this arrangement, the angle of arrival (AoA) is similarly defined as the angle between the observation vector and the normal axis to the plane. In embodiments, the antenna array of the tracker device may be arranged in any arbitrary manner, either in a linear array, a two-dimensional array, or a three dimensional array.

IV. Short-Range Communication Based Direction Finding

In some use cases of direction finding, such as asset tracking, privacy methods are required. One of the requirements may be that the tracker should be sure of the identity of the target device so that it gets the direction finding messages from the target device it is seeking. On the other hand, in asset tracking, the target device may need to only respond with direction finding messages that have been requested by authorized or proper tracker devices.

Some asset tracking use cases need a low cost implementation, whereas in other asset tracking use cases, the security features of the device are more important and justify a more expensive implementation. It would contribute to the flexibility of design options; to be able to provide tracker and target devices in a system without unnecessary complexity or requiring multiple encryption keys.

In Bluetooth LE, data signing is not specified for broadcasting purposes. Data signing information is carried as a higher layer payload in link layer of Bluetooth LE packets, and thus the link layer cannot react to higher layer data signing information. Since data signing information is handled on a higher layer in Bluetooth LE, the handling takes some time and the link layer may not proceed as quickly as it otherwise could. This may cause an arbitrary extra delay in a broadcast situation where a short message exchange between the tracker and target must be completed within strict timer limits. The arbitrary delay may cause the tracker device to wait an arbitrary interval to see whether the target device will react.

An example embodiment of the invention applies data signing for broadcast direction finding by Bluetooth LE devices, with support on the link layer:

The intended usage of data signing by the target device, may be informed by the target device in its advertising messages, in fields used by link layer, in an example embodiment of the invention. This helps tracker devices to prepare for the further message exchange with the target.

A message authentication code may optionally be set in advertising messages so that a tracker device can verify the target belongs to the system it is monitoring, before further message exchange, in an example embodiment of the invention.

The direction finding request sent by the tracker device to the target device, may contain the request of the tracker to use/not to use data signing in broadcast packets, in an example embodiment of the invention. The direction finding request may be sent by the tracker device in other types of packets, as response to an advertising packet from the target device, in an example embodiment of the invention. The direction finding request may be sent by the tracker device may indicate that data signing may be used once per request or continuously, in an example embodiment of the invention. A message authentication code may be included in the request from the tracker device, if it was asked for by the target device in its advertising packets, in an example embodiment of the invention.

The response from the target device to the request, may verify whether the target device will use data signing in its broadcast packets and how, in an example embodiment of the invention. This response may be made immediately, even though data signing may be calculated on host layer, since the link layer may be aware of the request and respond with an answer preconfigured by the target host, in an example embodiment of the invention.

If the target device has not requested tracker signing, the target link layer may autonomously start sending direction finding broadcast packets without waking up target host, in an example embodiment of the invention.

If the target device has requested tracker signing, the tracker may need to wait for an arbitrary interval in order for the target device to complete the process of verifying the identity of the tracker device, before the target device begins the direction finding broadcasting, in an example embodiment of the invention.

An example embodiment of the invention may be a method of power saving, where authentication may use bi-directional data signing once at every direction finding request event and once every direction finding response event, in an example embodiment of the invention.

FIG. 1 illustrates an example embodiment of the invention, depicting an example network diagram showing the target device 100 broadcasting an advertising packet 130, such as ADV_SCAN_IND, requesting data signing from tracker devices. An example data field for the advertising message 130 from the target device may be a Tracker_DS_req field that may be set in the advertising message link layer header, to indicate whether the target device requests data signing from tracker devices. Another example data field for the advertising message from the target device may be a Target_DS_usage field that may be set in the advertising message link layer header, to indicate the intention of the Target device to use or not to use data signing. Another example data field for the advertising message from the target device may be a Message Authentication Code (MAC) and related counter field that may be optionally set in advertising message link layer payload to sign the Target's advertising message 130.

The tracker device 102, in response, is shown sending a direction finding request (DF_REQ) packet 150 to the target device 100 and using the Bluetooth LE packet signing algorithm to include its own message identification code 200' in the direction finding request (DF_REQ) packet 150 to verify the identity of the tracker device 102. An example data field for the direction finding request (DF_REQ) packet 150 may be a Target_DS_req field that may be set in the DF_REQ message link layer header, to indicate whether or not the tracker device 102 wishes the target device 100 to use data signing and to indicate whether the data signing is needed continuously for all direction packets or just once. Another example data field for the direction finding request (DF_REQ) packet 150 may be a tTarget_DS_rsp field that may be set in the DF_RSP message link layer header, to indicate whether or not the target device 102 is using data signing and in which way, for example, continuously or once. Another example data field for the direction finding request (DF_REQ) packet 150 may be a message authentication field (MAC) and related counter field that may optionally be set in the DF_REQ message 150 to sign the tracker device 102.

The tracker device 102 may sign one or more direction finding request (DF_REQ) packets 150 by using the Bluetooth LE packet signing algorithm operating on the target device's own shared identification value and the shared secret key K, to generate a fully signed datagram that the tracker device 102 device sends to the target device 100 for verification, referred to herein as the message authentication code 200'. In accordance with an example embodiment of the invention, the target device 100 verifies the identity of the tracker device 102 that sent the direction finding request (DF_REQ) packet 150, by using the Bluetooth LE packet signing algorithm operating on the tracking device's shared identification value and the shared secret key K, to generate a trial signed datagram. If the trial signed datagram corresponds to the received, fully signed datagram, that is the message authentication code 200' in the direction finding request (DF_REQ) packet 150, then the target device 100 has verified the identity of the tracking device 102. The tracker device 102 may also include in the direction finding request (DF_REQ) packet 150, a request 135 for data signing from the target device 100, as shown in FIG. 1A.

FIG. 1A illustrates an example embodiment of the invention, depicting an example network diagram showing angle of departure (AoD) estimation being used to estimate a direction between wireless devices, the target device including data signing logic, wherein a target device transmits angle of departure packets that may include a message authentication code, to a tracker device that has single antenna, in accordance with at least one embodiment of the present invention.

In an example embodiment of the invention, the target device 100 may transmit an angle of departure (AoD_DF_BCST) packet 160 that includes a message authentication code field 200 and direction finding extension data, in accordance with at least one embodiment of the present invention. The angle of departure packet 160 is broadcast as a direction finding broadcast (AoD_DF_BCST) packet. An example data field in the direction finding broadcast packet 160 for the Message Authentication Code (MAC) and related counter field, may be set in the AoD_DF_BCST messages' payload 160, if requested by the tracking device 102 and/or supported by the target device 100.

The target device 100 includes the program 120 to generate the direction finding extension data. The direction finding extension data may include an indication whether the packet relates to angle-of-arrival (AoA) information, angle-of-departure (AoD) information, or both types. In an example embodiment of the invention, the indication whether the packet relates to angle-of-arrival (AoA) information, angle-of-departure (AoD) information may be located in the packet type field 166. The direction finding extension data may include a reference binary bit pattern, such as "11110000" in FIG. 1D, which illustrates an example of how the bits in the direction finding extension data 169 from the angle of departure packet 160 are transmitted by the antenna array 132 at the target device 100 and sampled at the tracker device 102, in accordance with at least one embodiment of the present invention.

In an example embodiment of the invention, the AoD_DF_BCST packet may include a data and length field, that includes data such as coding, length of the direction finding extension data, properties of the antennas A, B, C, and D, and other factors useful in enabling the tracker device 102 to estimate a direction. In embodiments of the invention, the target device 100 transmits the angle of departure packet 160, wherein the multiplexer 112 directs the RF signal bearing the angle of departure packet 160, from the radio 116 to one of the antennas A, B, C, or D in the antenna array 132 for transmission.

In an example embodiment of the invention, the data signing logic 210 in the target device 100 performs data signing to insert a message authentication code 200 into a field of the AoD packet to verify the signed packet. This allows a Bluetooth LE device to use data signing to provide integrity and authentication to protect against false target or tracker devices.

In accordance with an example embodiment of the invention, the data signing logic 210 in the target device 100 uses the Bluetooth LE packet signing algorithm to verify the identity of the sender of a packet 160. Prior to a communications session, the target device 100 and tracking device 102 may arrange to share a secret, symmetric key, K, and to share values representing the respective identities of the two devices 100 and 102. The values representing the respective identities of the target device 100 and tracking device 102 may include their respective serial numbers, their respective BT_ADDR address values, or other unique identification values. The sharing of the key K and identification values may take place at a previous time of manufacture of the target device 100 and tracking device 102 or in a pre-arranged setup of the two devices. In accordance with an example embodiment of the invention, a secure exchange procedure, such as Secure Socket Layer (SSL), may be used during the communications session to share the key K and the identification values.

Then, prior to or during a communications session, as shown in FIG. 1A, the target device 100 may use the data signing logic 210 to sign one or more packets 160 by using the Bluetooth LE packet signing algorithm operating on the target device's own shared identification value and the shared secret key K, to generate a fully signed datagram that the target 100 device sends to the tracker device 102 for verification. The fully signed datagram will be referred to herein as the message authentication code 200. In accordance with an example embodiment of the invention, the tracker device 102 verifies the identity of the target device 100 that sent the packet 160 by using the Bluetooth LE packet signing algorithm operating on the target device's shared identification value and the shared secret key K, to generate a trial signed datagram. If the trial signed datagram corresponds to the received, fully signed datagram, that is the message authentication code 200, then the tracking device 102 has verified the identity of the target device 100.

In example embodiments of the invention, the multiplexer 112 passes the direction finding extension data to a commutating RF switch 118 that connects the transmitter of the radio 116 to the antenna array 132 of antennas A, B, C, and D. The commutating RF switch 118 sequentially activates each of the four antennas A, B, C, and D at a commutating frequency to sequentially transmit 2-bit portions of the direction finding extension data in a data stream having the repeated reference pattern of bits "11110000", each 2-bit portion being transmitted in a consecutive phase incremented by an interval.

The target device 100 of FIG. 1A includes processor 122 that may access random access memory RAM 126 and/or read only memory ROM 127 in order to obtain stored program code and data for use during processing. RAM 126 or ROM 127 may generally include removable or imbedded memories that operate in a static or dynamic mode. Further, RAM 126 or ROM 127 may include rewritable memories such as Flash, EPROM, etc. Examples of removable storage media based on magnetic, electronic and/or optical technologies such as magnetic disks, optical disks, semiconductor memory circuit devices, and micro-SD memory cards are shown at 126'/127' and in FIG. 9, and may serve, for instance, as a program code and data input/output means. Code may include any interpreted or compiled computer language including computer-executable instructions. The code and/or data may be used to create software modules such as operating systems, communication utilities, user interfaces, more specialized program modules, etc.

Figure 1B:
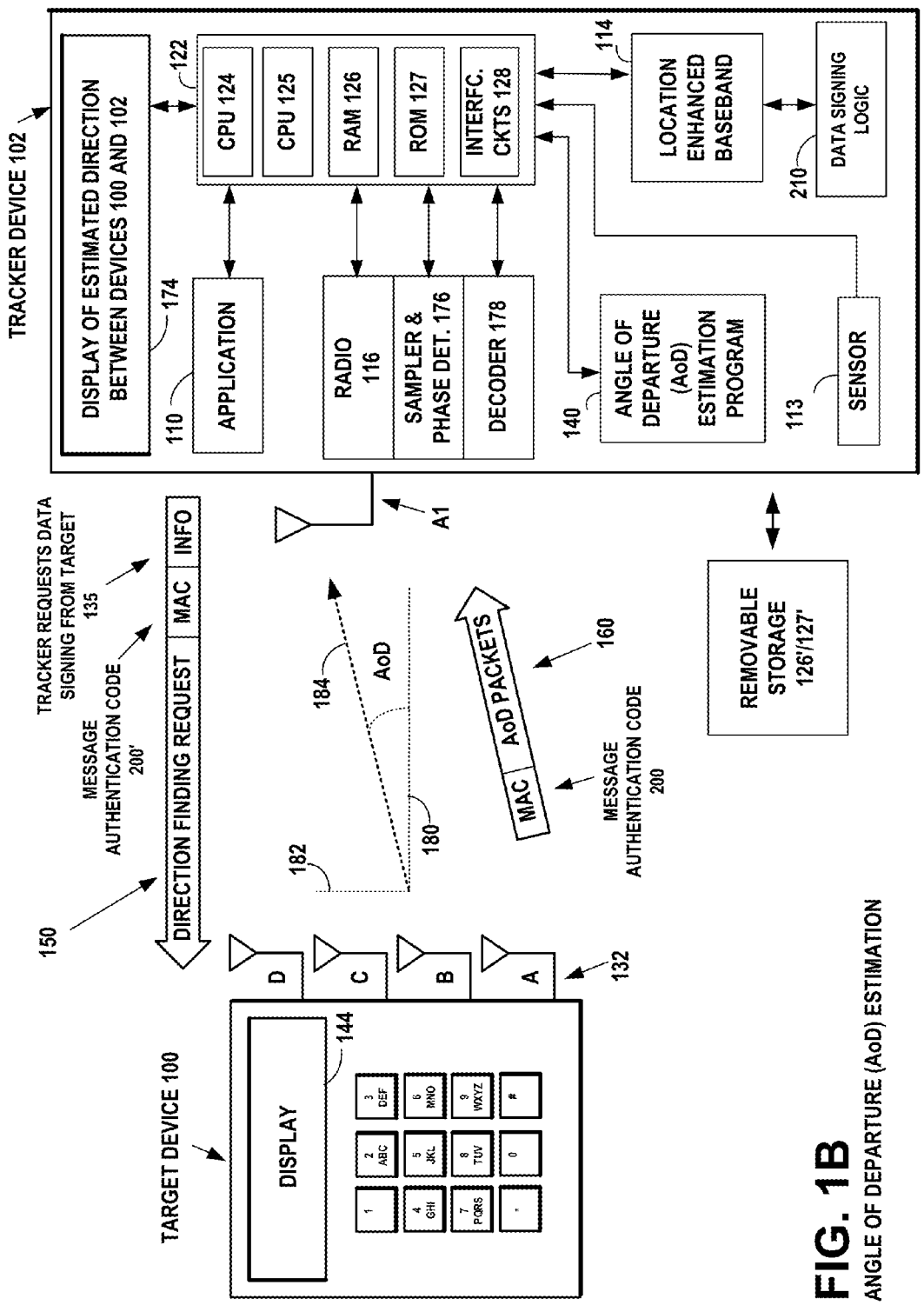
FIG. 1B illustrates an example embodiment of the invention, depicting the example network diagram of FIG. 1A, showing more details of the tracker device, the tracker device including data signing logic, in accordance with at least one embodiment of the present invention.

FIG. 1B illustrates an example embodiment of the invention, depicting the example network diagram of FIG. 1A, showing more details of the tracker device, the tracker device including data signing logic, in accordance with at least one embodiment of the present invention.

In an example embodiment of the invention, the data signing logic 210 in the tracker device 102 performs data signing to analyze the message authentication code into the field of the AoD packet to verify the signed packet.

In accordance with an example embodiment of the invention, the data signing logic 210 in the tracker device 102 uses the Bluetooth LE packet signing algorithm to verify the identity of the target device 100 of the packet 160. Prior to a communications session, the target device 100 and tracking device 102 may arrange to share a secret, symmetric key, K, and to share values representing the respective identities of the two devices 100 and 102. The values representing the respective identities of the target device 100 and tracking device 102 may include their respective serial numbers, their respective BT_ADDR address values, or other unique identification values. The sharing of the key K and identification values may take place at a previous time of manufacture of the target device 100 and tracking device 102 or in a pre-arranged setup of the two devices. In accordance with an example embodiment of the invention, a secure exchange procedure, such as Secure Socket Layer (SSL), may be used during the communications session to share the key K and the identification values.

Then, prior to or during a communications session, as shown in FIG. 1B, the target device 100 may sign one or more packets 160 by using the Bluetooth LE packet signing algorithm operating on the target device's own shared identification value and the shared secret key K, to generate a fully signed datagram that the target device 100 device sends to the tracker device 102 for verification, referred to herein as the message authentication code 200. In accordance with an example embodiment of the invention, the tracker device 102 verifies the identity of the target device 100 that sent the packet 160 with its data signing logic 210, by using the Bluetooth LE packet signing algorithm operating on the target device's shared identification value and the shared secret key K, to generate a trial signed datagram. If the trial signed datagram corresponds to the received, fully signed datagram, that is the message authentication code 200, then the tracking device 102 has verified the identity of the target device 100.

In example embodiments of the invention, the tracker device 102 may include an angle of departure (AoD) estimation program 140. In embodiments of the invention, the received angle of departure AoD_DF_BCST packet 160 identifies the packet as an angle of departure (AoD) packet, and the tracker device 102 begins sampling and phase detecting the sequentially transmitted reference data stream 200 of the direction finding extension data. The sampler and phase detector 176 performs a phase detection of the received 2-bit portions of the direction finding extension data in the data stream and their mutual phase offsets. Data related to the characteristics of the antennas A, B, C, and D, the commutating frequency of the antennas at the target device 100, and other factors, are included in the an angle of departure (AoD) AoD_DF_BCST packet 160, which enable an estimate to be made by the sampler and phase detector 176 and decoder 178 of the angle of departure (AoD) of the data stream, in accordance with at least one embodiment of the present invention.

The tracker device 102 of FIG. 1B includes processor 122 that may access random access memory RAM 126 and/or read only memory ROM 127 in order to obtain stored program code and data for use during processing. RAM 126 or ROM 127 may generally include removable or imbedded memories that operate in a static or dynamic mode. Further, RAM 126 or ROM 127 may include rewritable memories such as Flash, EPROM, etc. Examples of removable storage media based on magnetic, electronic and/or optical technologies such as magnetic disks, optical disks, semiconductor memory circuit devices, and micro-SD memory cards are shown at 126'/127' and in FIG. 9, and may serve, for instance, as a program code and data input/output means. Code may include any interpreted or compiled computer language including computer-executable instructions. The code and/or data may be used to create software modules such as operating systems, communication utilities, user interfaces, more specialized program modules, etc.

FIG. 1C illustrates an example embodiment of the invention shown in FIGS. 1A and 1B, wherein the target device is a key fob that transmits angle of departure (AoD) packets that may include a message authentication code, to the tracker device that is a mobile wireless telephone, to perform angle of departure (AoD) estimation of the angle between the two wireless devices, in accordance with at least one embodiment of the present invention.

Figure 1D:
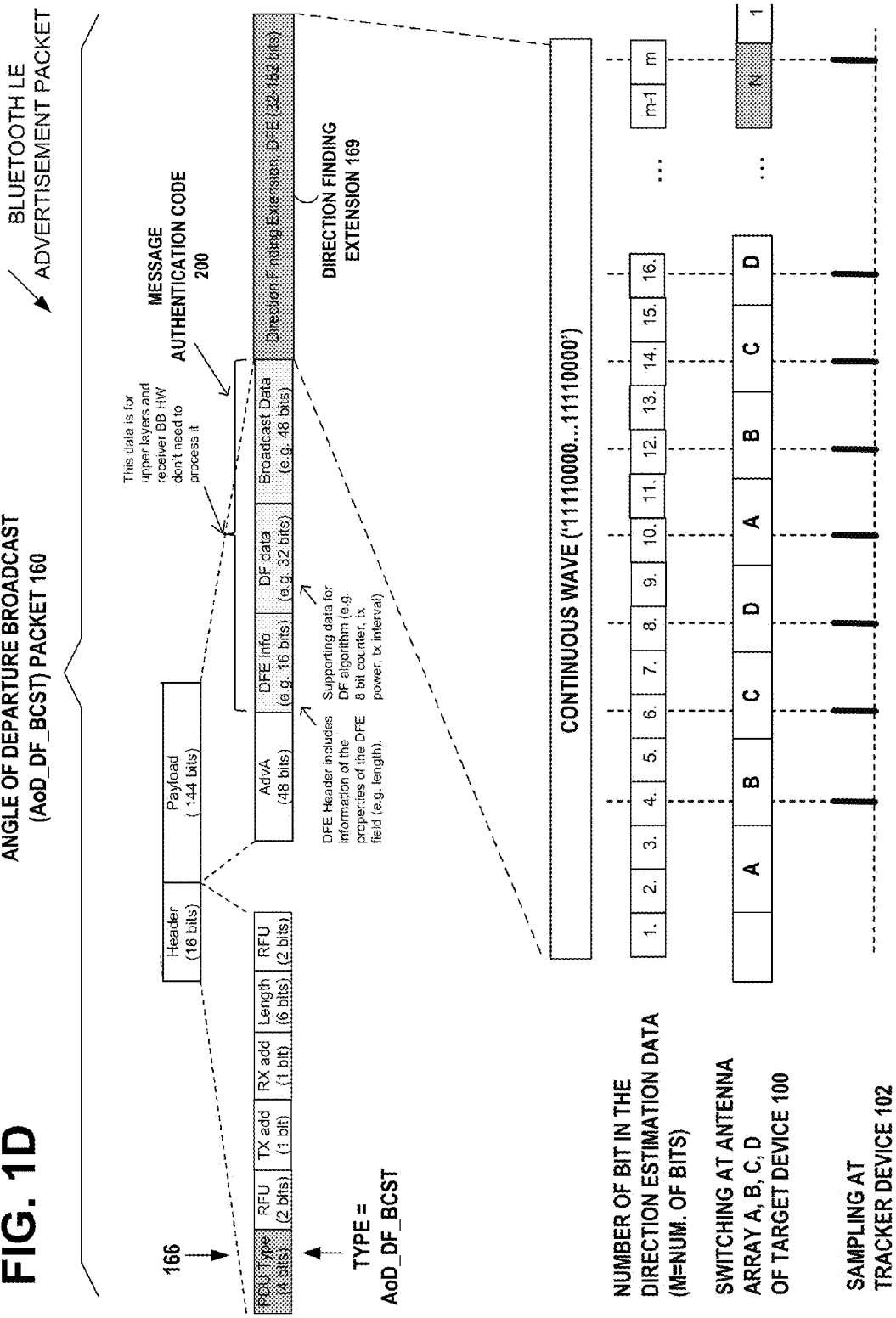
FIG. 1D illustrates an example embodiment of the invention, depicting an example of angle of departure (AoD) estimation, showing an AoD packet (AoD_DF_BCST) with a message authentication code field and an example of how the bits in a reference pattern in an angle of departure packet are transmitted by the antenna array of the target device and sampled at the tracker device, in accordance with at least one embodiment of the present invention.

FIG. 1D illustrates an example embodiment of the invention, depicting an example of angle of departure (AoD) estimation, showing an angle of departure AoD_DF_BCST packet 160 with a message authentication code field 200 and an example of how the bits in a reference pattern in an angle of departure packet are transmitted by the antenna array of the target device and sampled at the tracker device, in accordance with at least one embodiment of the present invention. In an example embodiment of the invention, the AoD_DF_BCST packet 160 may be a new type of Bluetooth LE advertising packet and the PDU Type field 166 identifies the packet as carrying information relevant to angle of departure direction finding.

Figure 2A:
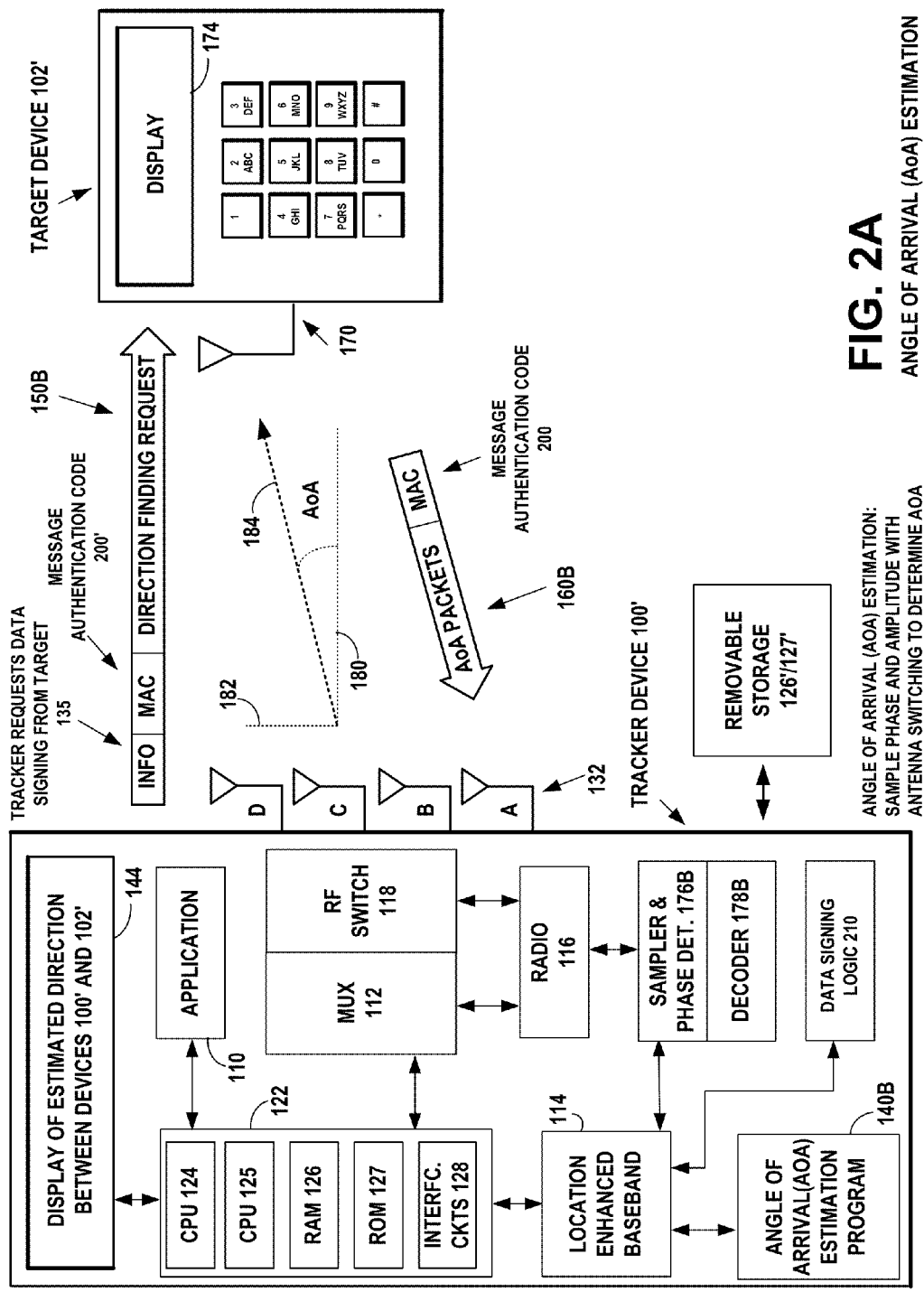
FIG. 2A illustrates an example embodiment of the invention, depicting an example of angle of arrival (AoA) estimation, showing an example network diagram of a target device having a single antenna transmitting angle of arrival packets that may include a message authentication code, to a tracker device, the tracker device including data signing logic, the tracker device determining angle of arrival using an antenna array, in accordance with at least one embodiment of the present invention.

FIG. 2 illustrates an example embodiment of the invention, depicting an example network diagram showing the target device 102' broadcasting an advertising packet 130B, such as ADV_SCAN_IND, requesting data signing from tracker devices. The tracker device 100', in response, is shown sending a direction finding request (DF_REQ) packet 150B to the target device 102', and using the Bluetooth LE packet signing algorithm to include its own message identification code 200' in the direction finding request (DF_REQ) packet 150B to verify the identity of the tracker device 100'. The tracker device 100' may also include in the direction finding request (DF_REQ) packet 150B, a request 135 for data signing from the target device 102', as shown in FIG. 2A.

The tracker device 100' may sign one or more direction finding request (DF_REQ) packets 150B by using the Bluetooth LE packet signing algorithm operating on the target device's own shared identification value and the shared secret key K, to generate a fully signed datagram that the tracker device 100' device sends to the target device 102' for verification, referred to herein as the message authentication code 200'. In accordance with an example embodiment of the invention, the target device 102' verifies the identity of the tracker device 100' that sent the direction finding request (DF_REQ) packet 150B, by using the Bluetooth LE packet signing algorithm operating on the tracking device's shared identification value and the shared secret key K, to generate a trial signed datagram. If the trial signed datagram corresponds to the received, fully signed datagram, that is the message authentication code 200' in the direction finding request (DF_REQ) packet 150B, then the target device 102' has verified the identity of the tracking device 100'.

FIG. 2A illustrates an example embodiment of the invention, depicting an example of angle of arrival (AoA) estimation, showing an example network diagram of a target device having a single antenna transmitting angle of arrival AoA_DF_BCST packets that may include a message authentication code, to a tracker device, the tracker device including data signing logic, the tracker device determining angle of arrival using an antenna array, in accordance with at least one embodiment of the present invention.

In example embodiments of the invention, the target device 102' transmits a direction finding response (DF_RSP) packet in response to the direction finding request (DF_REQ) packet. The target device 102' transmits the angle of arrival packet 160B, as an AoA_DF_BCST packet that indicates to the tracker device 100' that it contains angle of arrival (AoA) information. The target device 102' transmits angle of arrival packets 160B that may include a message authentication code 200, to a tracker device 100', in accordance with at least one embodiment of the present invention. The angle of arrival packet 160B is broadcast as a direction finding broadcast (AoA_DF_BCST) packet.

In an example embodiment of the invention, the AoA_DF_BCST packet 160B may be a new type of Bluetooth LE advertising packet and the PDU Type field 166 identifies the packet as carrying information relevant to angle of arrival direction finding. The angle of arrival packet 160B may include a reference binary bit pattern, such as "11110000". FIG. 2D illustrates an example of how the bits in the reference pattern from the angle of arrival AoA_DF_BCST packet 160B are transmitted by the single antenna 170 at the target device 102' and received by the antenna array at the tracker device 100', in accordance with at least one embodiment of the present invention.

In example embodiments of the invention, the angle of arrival packet 160B may include a data and length field, that includes data such as coding, length of the direction finding extension data, and other factors useful in enabling the tracker device 100' to estimate a direction. The angle of arrival packet 160B may also include direction finding extension data that may comprise several concatenated segments of the binary bit pattern. In embodiments of the invention, the target device 102' transmits the angle of arrival packet 160B from the antenna 170. The direction finding extension data is transmitted as a reference data stream.

In example embodiments of the invention, the tracker device 100' may receive the angle of arrival AoA_DF_BCST packet 160B. The angle of arrival (AoA) estimation is made by sampling the phase and amplitude of the reference bits of the direction finding extension data. The tracker device 100' includes a sampler and phase detector 176B, a decoder 178B, and an angle of arrival (AoA) estimation program 140B to estimate the angle of arrival (AoA) of the reference data stream, based on the angle of arrival packet 160B received from the target device 102'.

The tracker device 100' of FIG. 2A includes processor 122 that may access random access memory RAM 126 and/or read only memory ROM 127 in order to obtain stored program code and data for use during processing. RAM 126 or ROM 127 may generally include removable or imbedded memories that operate in a static or dynamic mode. Further, RAM 126 or ROM 127 may include rewritable memories such as Flash, EPROM, etc. Examples of removable storage media based on magnetic, electronic and/or optical technologies such as magnetic disks, optical disks, semiconductor memory circuit devices, and micro-SD memory cards are shown at 126'/127' and in FIG. 9, and may serve, for instance, as a program code and data input/output means. Code may include any interpreted or compiled computer language including computer-executable instructions. The code and/or data may be used to create software modules such as operating systems, communication utilities, user interfaces, more specialized program modules, etc.

Figure 2B:
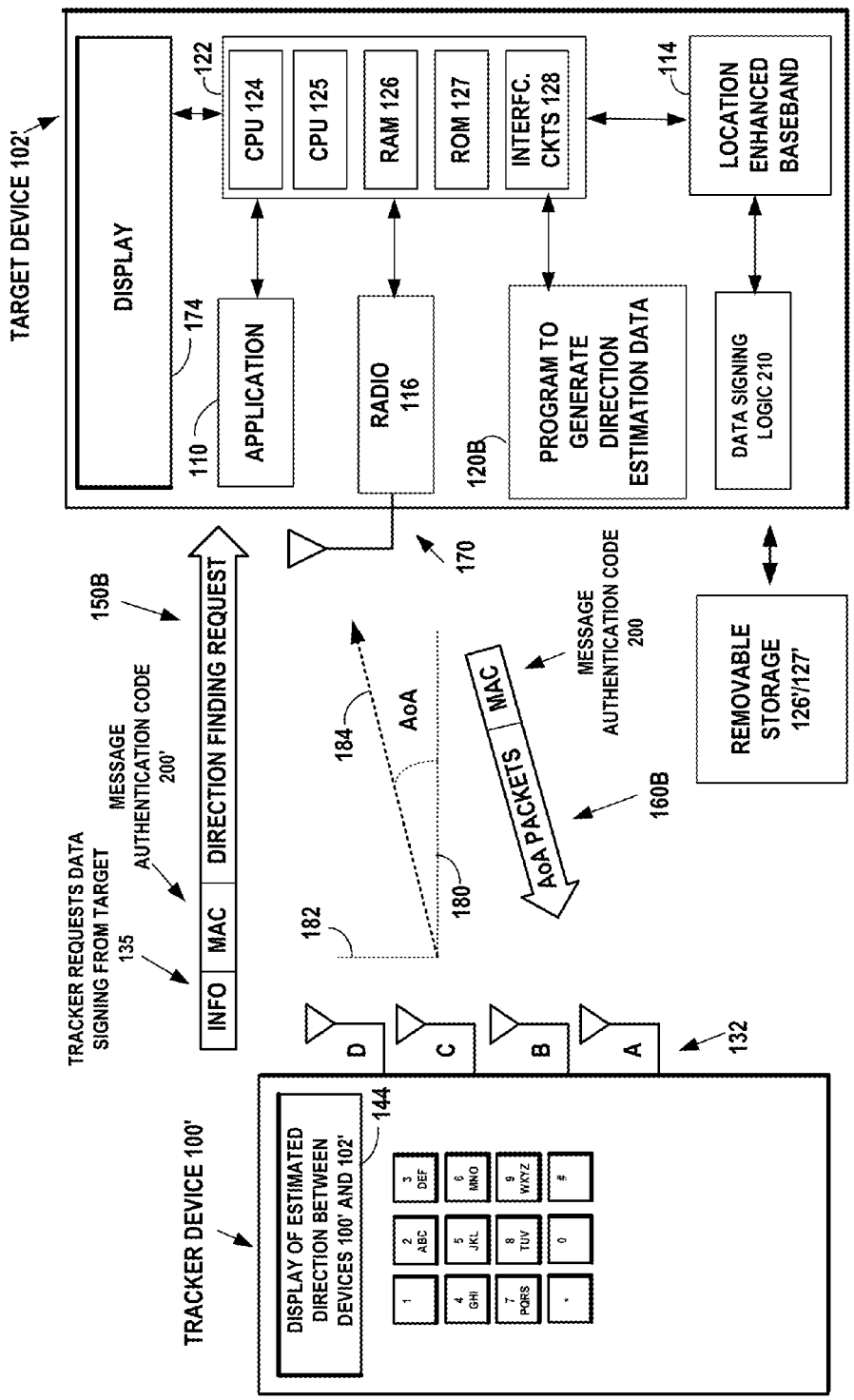
FIG. 2B illustrates an example embodiment of the invention, depicting the example network diagram of FIG. 2A, showing more details of the target device including data signing logic, in accordance with at least one embodiment of the present invention.

FIG. 2B illustrates an example embodiment of the invention, depicting the example network diagram of FIG. 2A, showing more details of the target device including data signing logic, in accordance with at least one embodiment of the present invention.

The target device 102' of FIG. 2B includes processor 122 that may access random access memory RAM 126 and/or read only memory ROM 127 in order to obtain stored program code and data for use during processing. RAM 126 or ROM 127 may generally include removable or imbedded memories that operate in a static or dynamic mode. Further, RAM 126 or ROM 127 may include rewritable memories such as Flash, EPROM, etc. Examples of removable storage media based on magnetic, electronic and/or optical technologies such as magnetic disks, optical disks, semiconductor memory circuit devices, and micro-SD memory cards are shown at 126'/127' and in FIG. 9, and may serve, for instance, as a program code and data input/output means. Code may include any interpreted or compiled computer language including computer-executable instructions. The code and/or data may be used to create software modules such as operating systems, communication utilities, user interfaces, more specialized program modules, etc.

FIG. 2C illustrates an example embodiment of the invention shown in FIGS. 2A and 2B, wherein the target device is a key fob that transmits angle of arrival (AoA) packets that may include a message authentication code, to the tracker device that is a mobile wireless telephone, the tracker device 100' determining an angle of arrival using an antenna array, in accordance with at least one embodiment of the present invention.

FIG. 2D illustrates an example embodiment of the invention, depicting an example of angle of arrival (AoA) estimation, showing an example angle of arrival AoA_DF_BCST packet 160B with a message authentication code field 200 and how the bits in the reference pattern from the angle of arrival packet are transmitted by the single antenna at the target device and received by the antenna array and sampled at the tracker device, in accordance with at least one embodiment of the present invention. In an example embodiment of the invention, the AoA_DF_BCST packet 160B may be a new type of Bluetooth LE advertising packet and the PDU Type field 166 identifies the packet as carrying information relevant to angle of arrival direction finding.

Figure 3:
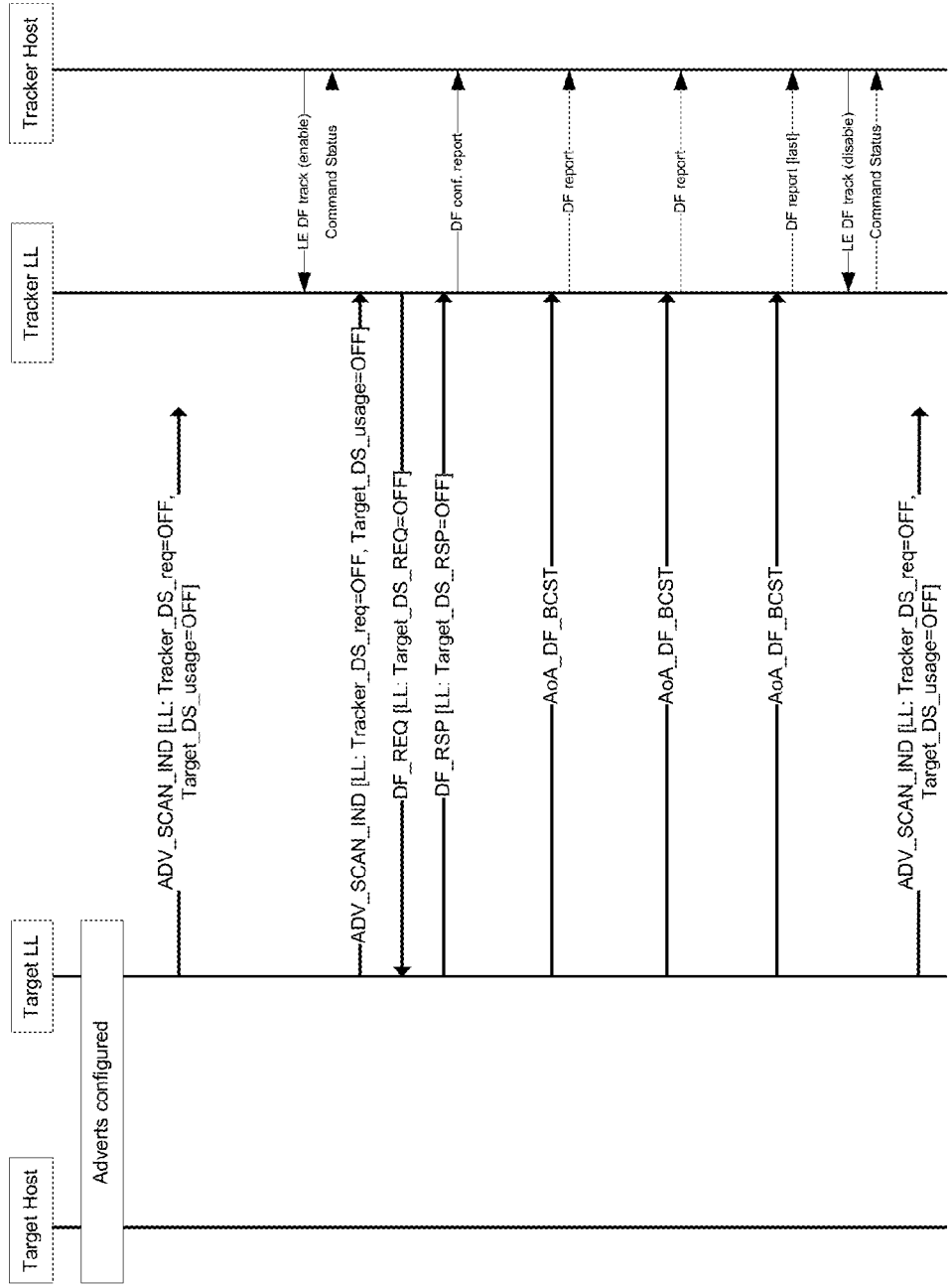
FIG. 3: is an example sequence diagram of broadcasting direction finding packets on request, with data signing features set off. Target link layer may check if the tracker is in its white list. Target host may not be involved at all during the functionality, which saves power at target device, in accordance with at least one embodiment of the present invention.
Figure 4:
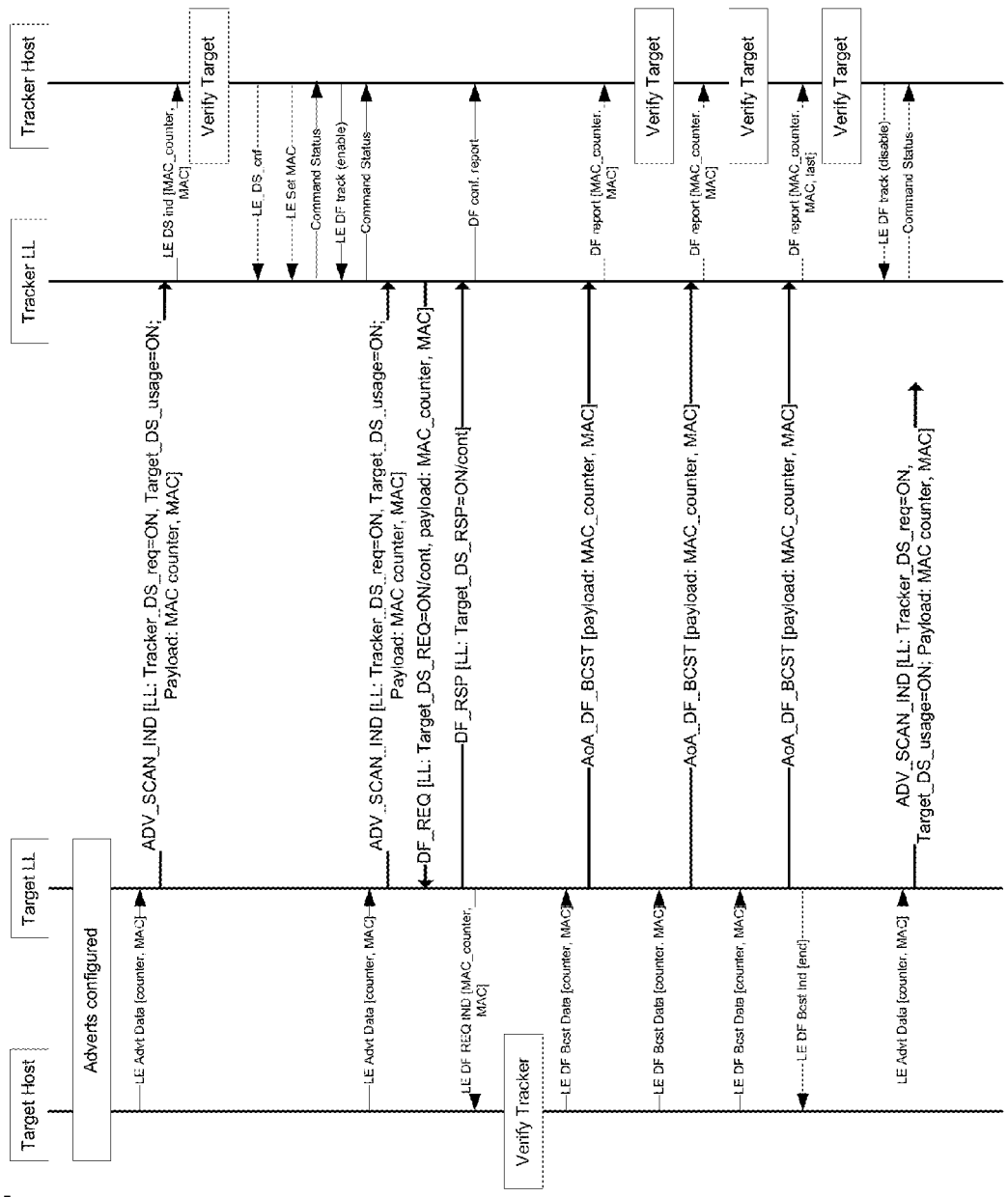
FIG. 4 is an example sequence diagram of broadcasting direction finding packets on request, with data signing features set on for tracker requests and continuously on for target's packets, in accordance with at least one embodiment of the present invention.
Figure 5:
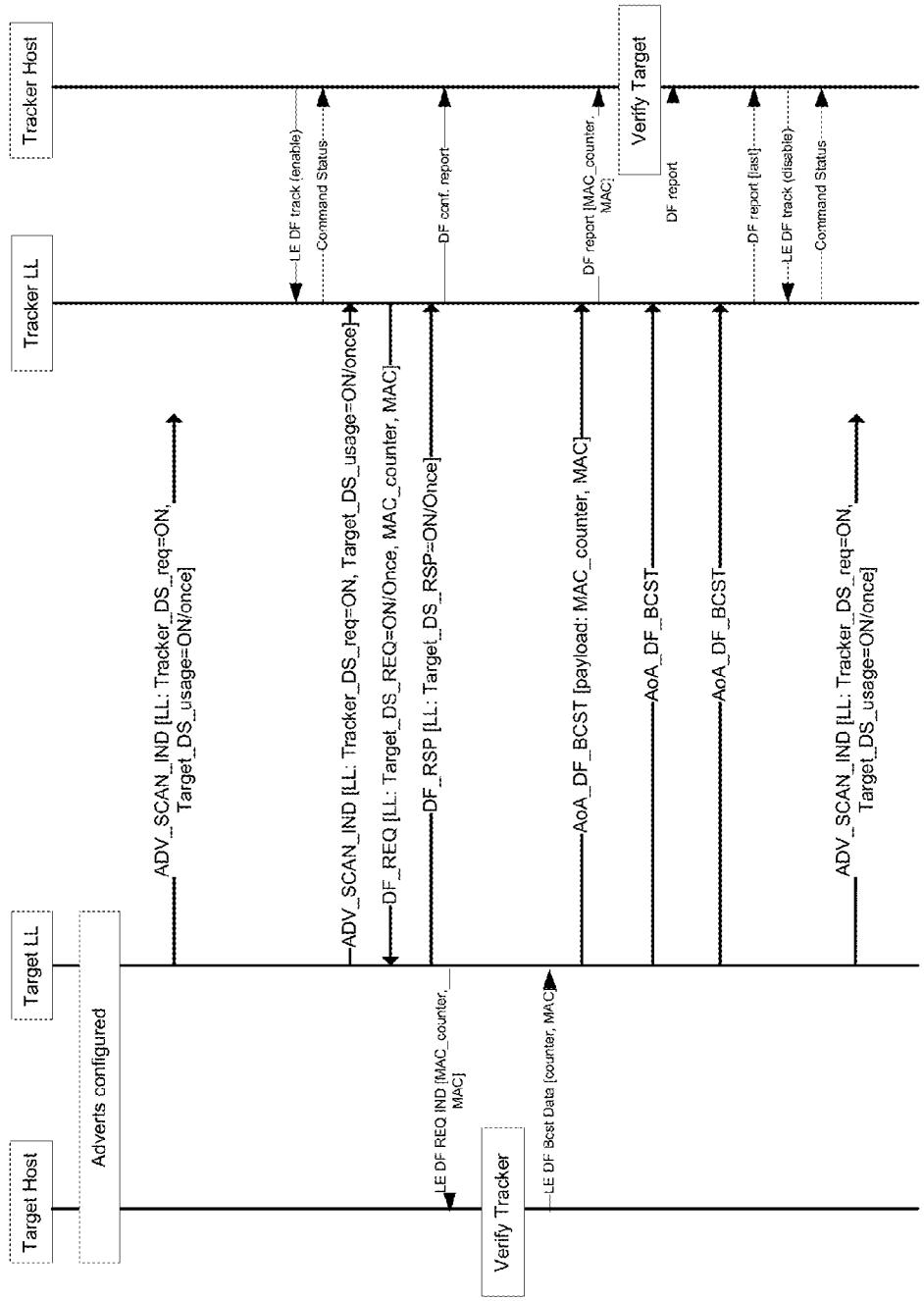
FIG. 5 is an example sequence diagram of broadcasting direction finding packets on request, with data signing features set on for tracker requests and on for one target's packet per request, in accordance with at least one embodiment of the present invention.

FIGS. 3, 4, and 5 show examples of the messaging in the example systems shown in FIGS. 1A and 2A. FIG. 3 is an example embodiment of the invention, showing an example sequence diagram of broadcasting direction finding packets on request, with data signing features set off. Neither the target nor the tracker requests usages of data signing. Target link layer may check if the identify of the tracker device is in its white list of authorized devices permitted to request direction finding packets. Target host may not need to be involved at all during the functionality, which saves power at target device, in accordance with at least one embodiment of the present invention. The target device transmits angle of arrival AoA_DF_BCST packets to the tracker device without a message authentication code.

FIG. 4 is an example sequence diagram of the target device broadcasting direction finding packets on request from the tracker device, with data signing features set on for tracker requests and continuously on for target's packets, in accordance with at least one embodiment of the present invention. In the second example of FIG. 4, both the target and tracker request the usage of data signing. The target device transmits an advertising ADV_SCAN_IND packet with a message authentication code and a request for data signing. The tracker responds with a direction finding request DF_REQ packet with a message authentication code and a request for continuous data signing. The target responds with a direction finding response DF_RSP packet agreeing with the continuous data signing request. The target then proceeds to transmit angle of arrival AoA_DF_BCST packets to the tracker device with continuous data signing.

FIG. 5 is an example sequence diagram of the target device broadcasting direction finding packets on request from the tracker device, with data signing features set on for tracker requests and on for one target's packet per request, in accordance with at least one embodiment of the present invention. In the third example of FIG. 5, a practical case is shown where both the target and the tracker request the usage of data signing, but target only uses the data signing once per direction finding request (DF_REQ). The target device transmits an advertising ADV_SCAN_IND packet with a message authentication code and a request for data signing once. The tracker responds with a direction finding request DF_REQ packet with a message authentication code and agreeing with a single data signing. The target responds with a direction finding response DF_RSP packet agreeing with the single data signing request. The target then proceeds to transmit angle of arrival AoA_DF_BCST packets to the tracker device with only the first packet signed.

Furthermore, example embodiments of the invention enable different situations:

In case the target device requests the data signing from tracker, but the data signing does not pass, the target may not continue by transmitting direction finding broadcast packets, but it may return to advertising state, in accordance with an embodiment of the invention.

The target may send data signed advertising packets, but the tracker may not have requested the signing in broadcast packets. It would be difficult for a third party to start faking the target at the point when the real target is being contacted with a direction finding request (DF_REQ). Therefore, this may be a reasonably secure variation and the host of the target may not involved during the broadcasting which saves power.

The broadcast packet AoD_DF_BCST or AoA_DF_BCST may also be an advertising channel packet, for example the ADV_IND advertising packet in the Bluetooth specification, containing the fields in similar manner as shown for broadcast packets in FIGS. 3-5.

Data Fields

The following are data fields for the advertising message from the target device, the data fields for the direction finding request message (DF_REQ) from the tracker device, the direction finding response message (DF_RSP), and broadcast message that is either an angle of arrival broadcast (AoA_DF_BCST) packet or an angle of departure broadcast (AoD_DF_BCST) packet from the target device:

New Tracker_DS_req field is set in advertising message (LL header) to indicate if the target requests Data Signing from Tracker devices.

New Target_DS_usage field is set in advertising message (LL header) to indicate the aim of the Target to use/not to use Data Signing.

MAC (Message Authentication Code) and related counter field are optionally set in advertising message (LL payload) to sign the Target's message.

New Target_DS_req field is set in DF_REQ message (LL header) to indicate whether the tracker wishes the target to use Data Signing or not and to indicate if the Data Signing is needed continuously for all direction packets or just once.

MAC and related counter field are optionally set in the DF_REQ message to sign the Tracker.

New Target_DS_rsp field is set in DF_RSP message (LL header) to indicate whether the target is using Data Signing or not and in which way (continuously or once).

MAC (Message Authentication Code) and related counter field is set in AoD_DF_BCST or AoA_DF_BCST messages' payload (if requested and/or supported by the Target)

The solution provides a major enhancement to the security of the Bluetooth LE (BLE) broadcasting and operation together with direction finding. The key management is simple due to using common key(s) inside the system. More in details, the solution makes possible the selection of the required data signing by both the target and the tracker, enables very low power solutions where target host may not be involved. The arbitrary waiting time of the tracker due to target host processing of data signing, may be limited and a fast response solution is enabled.

FIG. 6A illustrates an example embodiment of the invention, depicting an example flow diagram 320 of an example method, from the point of view of the target device 100, in accordance with at least one embodiment of the present invention. The steps of the flow diagram represent computer code instructions stored in the RAM memory of the device, which when executed by the central processing unit (CPU), carry out the functions of a example embodiment of the invention. Alternately, some or all of the steps in the procedure of the flow diagram may be embodied as hardware program logic included in programmed logic arrays of sequential and/or combinatorial logic circuits and/or state machine logic implementing some or all of the steps performed by embodiments of the invention. The steps may be carried out in another order than shown and individual steps may be combined or separated into component steps. The method includes the steps of:

Step 322: transmitting by a target device, information in one or more advertising packets, including preferences of the target device for using data signing associated with direction finding; and Step 324: receiving by the target device from a tracker device, one or more direction finding request packets including a request for data signing corresponding with the target device preferences.

FIG. 6B illustrates an example embodiment of the invention, depicting an example flow diagram 620 of an example method, from the point of view of the tracker device 102, in accordance with at least one embodiment of the present invention. The steps of the flow diagram represent computer code instructions stored in the RAM memory of the device, which when executed by the central processing unit (CPU), carry out the functions of a example embodiment of the invention. Alternately, some or all of the steps in the procedure of the flow diagram may be embodied as hardware program logic included in programmed logic arrays of sequential and/or combinatorial logic circuits and/or state machine logic implementing some or all of the steps performed by embodiments of the invention. The steps may be carried out in another order than shown and individual steps may be combined or separated into component steps. The method includes the steps of:

Step 622: receiving by a tracker device, information in one or more advertising packets from a target device, including preferences of the target device for data signing associated with direction finding; and Step 624: transmitting by the tracker device to the target device, one or more direction finding request packets including a request for data signing corresponding with the target device preferences.

Figure 7:
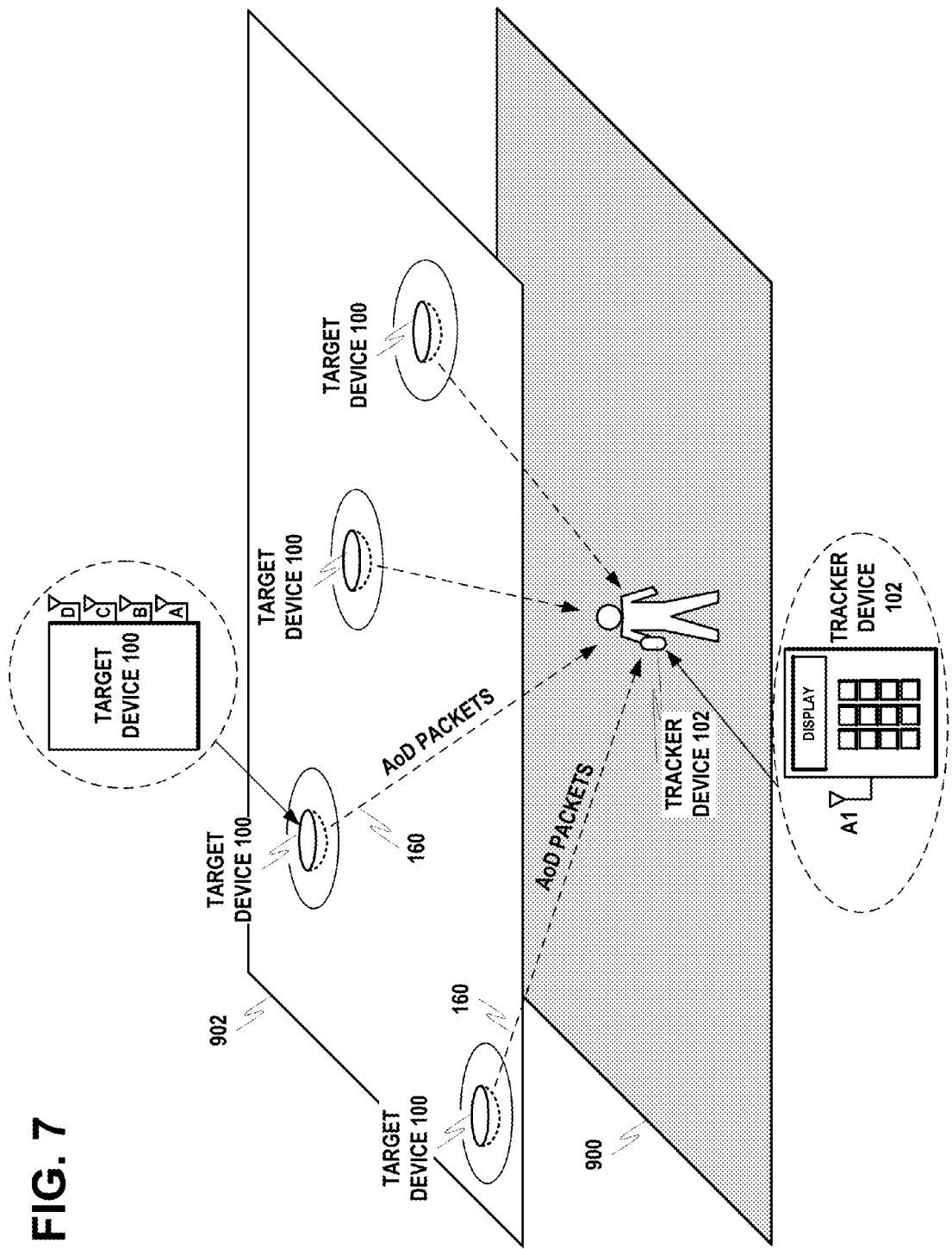
FIG. 7 illustrates a network of ceiling beacons that incorporate angle of departure (AoD) estimation being used to estimate a direction between wireless devices, wherein a target device in a ceiling beacon transmits angle of departure packets that may include a message authentication code, to a tracker device in a mobile communications device, the tracker device determining an angle of departure, in accordance with at least one embodiment of the present invention.

FIG. 7 illustrates a network of ceiling beacons that incorporate angle of departure (AoD) estimation to estimate a direction between wireless devices. A target device 100 in a ceiling beacon transmits angle of departure (AoD) packets 160 that may include a message authentication code, to a tracker device 102 in a mobile communications device, in accordance with at least one embodiment of the present invention.

In an example embodiment of the invention, the tracker device 102 of FIG. 1A is held by a user standing on a floor 900 beneath the ceiling 902 in a room or corridor within a building. An array of target devices 100 of FIG. 1A are mounted as ceiling beacons on or within the ceiling 902 above the floor. In example embodiments of the invention, each target device 100 may be located in a known position in the ceiling 902. One or more of the target devices 100 are transmitting angle of departure (AoD) packets 160.

The tracker device 102 receives the angle of departure packets 160. The tracker device takes demodulated In-phase/Quadrature (I/Q) signal samples while receiving the direction finding extension data and passes this data forward to an entity that is able calculate the angle estimation. The angle estimation is then returned to the tracker. The tracker generates the In-phase/Quadrature (I/Q) signal samples and finally the angle estimation based on the determined angle of departure (AoD), in accordance with at least one embodiment of the present invention.

In an example embodiment of the invention, the target device 100 and the tracker device 102 of FIG. 7 may include data signing logic and removable or imbedded memories that operate in a static or dynamic mode. The target device 100 and the tracker device 102 of FIG. 7 may include rewritable memories such as Flash, EPROM, etc. Examples of removable storage media based on magnetic, electronic and/or optical technologies such as magnetic disks, optical disks, semiconductor memory circuit devices, and micro-SD memory cards are shown at 126'/127' and in FIG. 9, and may serve, for instance, as a program code and data input/output means. Code may include any interpreted or compiled computer language including computer-executable instructions. The code and/or data may be used to create software modules such as operating systems, communication utilities, user interfaces, more specialized program modules, etc.

Figure 8A:
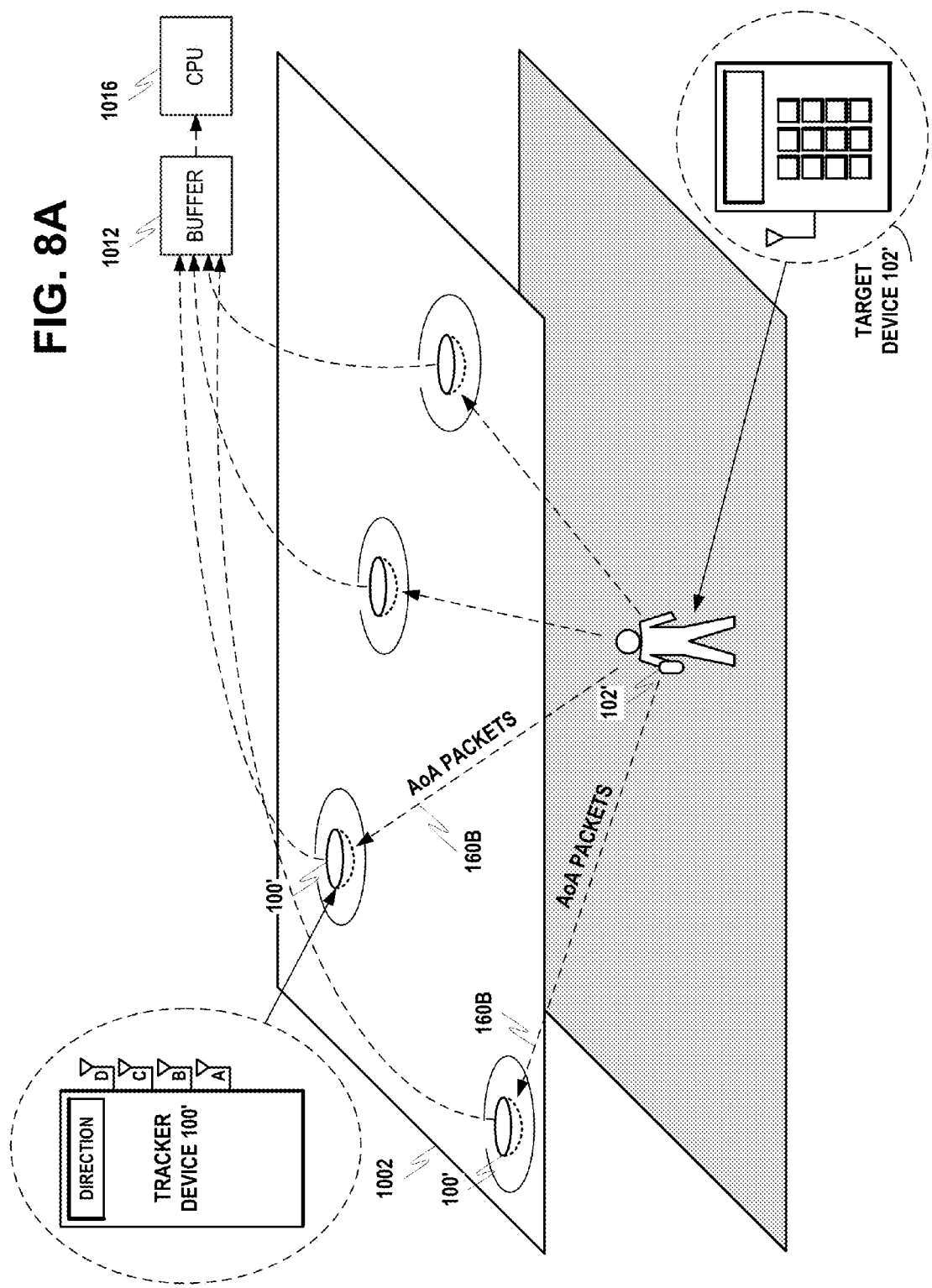
FIG. 8A illustrates a network of ceiling beacons that incorporate angle of arrival (AoA) estimation, showing an example network diagram of a target device in a mobile communications device having a single antenna transmitting angle of arrival packets that may include a message authentication code, to a tracker device in a ceiling beacon, the tracker device determining an angle of arrival using an antenna array, in accordance with at least one embodiment of the present invention.

FIG. 8A illustrates a network of ceiling beacons that incorporate angle of arrival (AoA) estimation, showing an example network diagram of a target device 102' in a mobile communications device having a single antenna transmitting angle of arrival packets 160B that may include a message authentication code, to a tracker device 100' in a ceiling beacon. The tracker device 100' receives the angle of arrival packets 160B. The tracker device takes demodulated In-phase/Quadrature (I/Q) signal samples while receiving the direction finding extension data and passes this data forward to an entity that is able calculate the angle estimation. The angle estimation is then returned to the tracker. The tracker generates the In-phase/Quadrature (I/Q) signal samples and finally the angle estimation based on the determined angle of arrival (AoA), in accordance with at least one embodiment of the present invention.

In the tracker device 100' in the ceiling beacon, the antenna array is composed of antennas A, B, C and D. In example embodiments of the invention, array A1 may have a different number of antennas.

In example embodiments of the invention, the target device 102' of FIG. 2A is held by a user standing on a floor 900 beneath the ceiling 902 in a room or corridor within a building. An array of tracker devices 100' of FIG. 2A are mounted as ceiling beacons on or within the ceiling 902 above the floor.

In example embodiments of the invention, each tracker device 100' in a ceiling beacon within range of the target device 102' held by the user, may determine an angle of arrival of arrival packets 160B sent from the target device 102'.

In example embodiments of the invention, each of the tracker devices 100' in the ceiling beacons, may send its the determined angle of arrival to the buffer 1012 and CPU 1016 for a computation by triangulation, of the two dimensional or three dimensional location of the target device 102' held by the user. The computed location of the target device 102' held by the user may be used for security monitoring or surveillance purposes.

FIG. 8B illustrates an example embodiment of the invention, wherein the network of ceiling beacons that incorporate angle of arrival (AoA) estimation, as shown in FIG. 8A. The two dimensional or three dimensional location of the target device held by the user, as computed by the CPU, is fed back to the target device 102' held by the user, for purposes, such as displaying navigational information, in accordance with at least one embodiment of the present invention. In an example embodiment of the invention, the two dimensional or three dimensional location of the target device 102' held by the user, as computed by the CPU 1016, may be fed back to the target device 102' held by the user, for purposes, such as displaying navigational information.

The tracker device 100' and the target device 102' of FIGS. 8A and 8B may include removable or imbedded memories that operate in a static or dynamic mode. The tracker device 100' and the target device 102' of FIGS. 8A and 8B may include rewritable memories such as Flash, EPROM, etc. Examples of removable storage media based on magnetic, electronic and/or optical technologies such as magnetic disks, optical disks, semiconductor memory circuit devices, and micro-SD memory cards are shown at 126'/127' and in FIG. 9, and may serve, for instance, as a program code and data input/output means. Code may include any interpreted or compiled computer language including computer-executable instructions. The code and/or data may be used to create software modules such as operating systems, communication utilities, user interfaces, more specialized program modules, etc.

An example embodiment of the invention shown in FIG. 8B is embedded in tracking a target device in a system as in FIG. 8B. In the example, a Bluetooth Low Energy (BLE) transceiver is attached to a target device that is to be tracked. The BLE tag is capable of sending direction finding enhanced packets that are tracked by trackers, also referred to as location observers. The trackers communicate with a server that also provides information to a monitoring/controlling/alarming device having user interface.

FIG. 8B illustrates an example of asset tracking, in accordance with an embodiment of the invention. A BLE tag transmits direction finding enhanced packets, which are tracked by Location Observers. The Location Observers communicate with a Server, which provides information for a monitoring user interface.

A BLE tag equipped device (target) is given two data signing keys, for example by bonding the tag with a configuration device. First key is used for signing the tag itself, to calculate a message authentication code (MAC) to be placed into the packets the tag transmits. The second key is the key of the observing system that the location observers (trackers) may set a message authentication code as well in their packets so that the tag can identify the requests are coming from the system it has a key to. The location observers share the same two keys. Having only two (or even one if they are the same) keys in the system makes it possible to add new tag equipped target devices and new location observers into the system without a need to update used keys.

Figure 9:
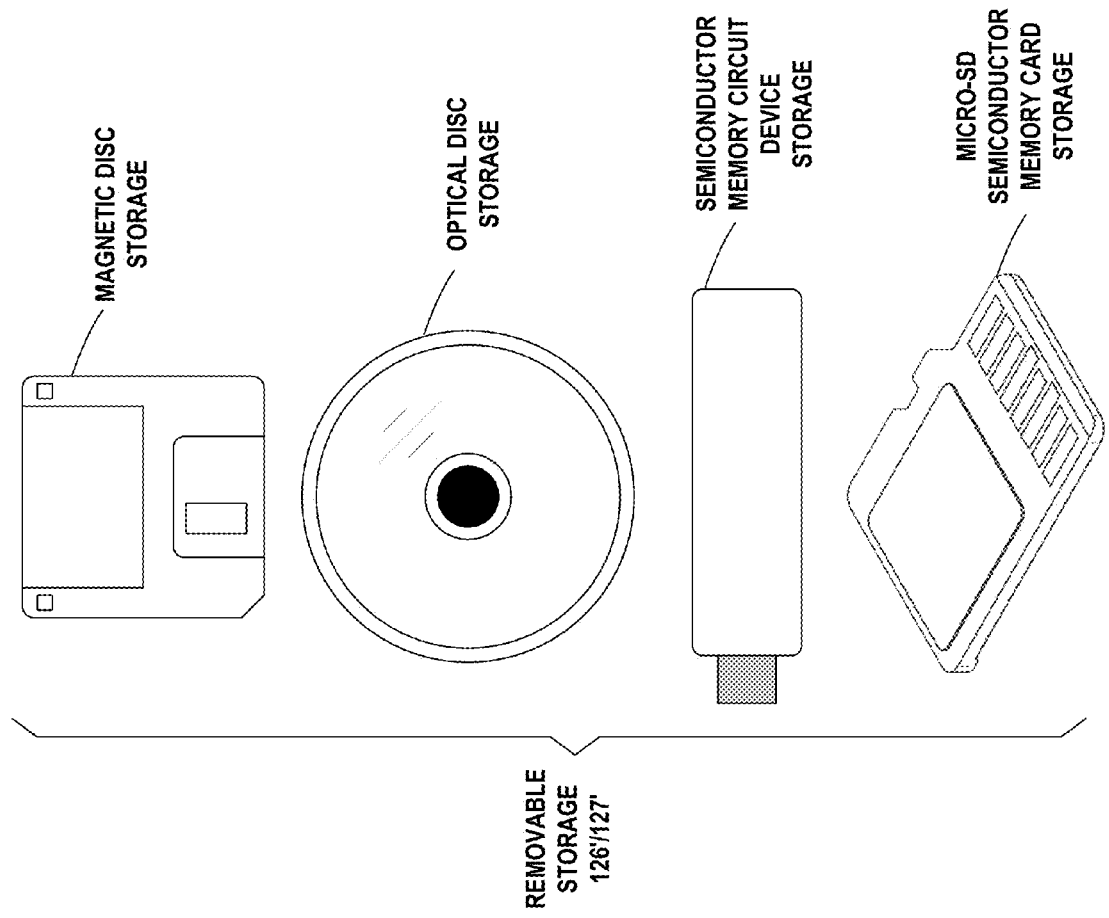
FIG. 9 illustrates an example embodiment of the invention, wherein examples of removable storage media are shown, based on magnetic, electronic and/or optical technologies, such as magnetic disks, optical disks, semiconductor memory circuit devices, and micro-SD memory cards for storing data and/or computer program code as an example computer program product, in accordance with at least one embodiment of the present invention.

FIG. 9 illustrates an example embodiment of the invention, wherein examples of removable storage media are shown, based on magnetic, electronic and/or optical technologies, such as magnetic disks, optical disks, semiconductor memory circuit devices, and micro-SD memory cards for storing data and/or computer program code as an example computer program product, in accordance with at least one embodiment of the present invention.

An example embodiment of the invention provides a major enhancement to the security of Bluetooth LE broadcasting and operation together with direction finding. The key management is simple due to the use of common key(s) inside the system. An example embodiment of the invention makes possible the selection of required data signing (target/tracker), enables very low power solutions where the target's host may not be involved. An example embodiment of the invention provides reduced waiting times for the tracker, since processing of data signing by the target host is minimized.

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable non-transient medium.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless communication networks, the Internet, intranets, telephone/modem-based network communication, hard-wired/cabled communication network, satellite communication, and other stationary or mobile network systems/communication links.

Although specific example embodiments have been disclosed, a person skilled in the art will understand that changes can be made to the specific example embodiments without departing from the spirit and scope of the invention.

What is claimed is:

1. A method, comprising:
    transmitting by a target device, information in one or more Bluetooth LE advertising packets, including preferences of the target device for using data signing associated with direction finding;
    receiving by the target device from a tracker device, one or more direction finding request packets including a request for data signing corresponding with the target device preferences and a data signature of the tracker device included in at least one of the one or more direction finding request packets;
    generating by the target device, a data signature of the target device; and broadcasting by the target device to the tracker device, one or more Bluetooth LE advertising packets, including a packet type indication that the packet is a direction finding packet, the packet including the data signature and direction finding data for at least one of an angle of arrival of angle (AoA) and angle of departure (AoD) estimation of the packet.

2. The method of claim 1, further comprising:
including in the transmitted Bluetooth LE advertising packet, a request for data signing by tracker devices.

3. An apparatus, comprising:
at least one processor;
at least one memory including computer program code;
the at least one memory and the computer program code to, with the at least one processor, cause the apparatus at least to:
transmit information in one or more Bluetooth LE advertising packets, including preferences of the apparatus for using data signing associated with direction finding;
receive from a tracker device, one or more direction finding request packets including a request for data signing corresponding with the apparatus preferences and a data signature of the tracker device included in at least one of the one or more direction finding request packets;
generate a data signature of the apparatus; and
broadcast to the tracker device, one or more Bluetooth LE advertising packets, including a packet type indication that the packet is a direction finding packet, the packet including the data signature and direction finding data for at least one of an angle of arrival of angle (AoA) and angle of departure (AoD) estimation of the packet.

4. The apparatus of claim 3, wherein
the at least one memory and the computer program code to, with the at least one processor, further cause the apparatus at least to:
include in the transmitted Bluetooth LE advertising packet, a request for data signing by tracker devices.

5. A computer program product comprising computer executable program code recorded on a computer readable non-transitory storage medium, the computer executable program code when executed, performing steps comprising:
transmitting by a target device, information in one or more Bluetooth LE advertising packets, including preferences of the target device for using data signing associated with direction finding;
receiving by the target device from a tracker device, one or more direction finding request packets including a request for data signing corresponding with the target device preferences and a data signature of the tracker device included in at least one of the one or more direction finding request packets;
generating by the target device, a data signature of the target device; and
broadcasting by the target device to the tracker device, one or more Bluetooth LE advertising packets, including a packet type indication that the packet is a direction finding packet, the packet including the data signature and direction finding data for at least one of an angle of arrival of angle (AoA) and angle of departure (AoD) estimation of the packet.

6. The computer program product of claim 5, further comprising computer executable program code recorded on a computer readable non-transitory storage medium, the computer executable program code when executed, performing steps comprising:
including in the transmitted Bluetooth LE advertising packet, a request for data signing by tracker devices.

7. A method, comprising:
receiving by a tracker device, information in one or more Bluetooth LE advertising packets from a target device, including preferences of the target device for data signing associated with direction finding;
transmitting by the tracker device to the target device, one or more direction finding request packets including a request for data signing corresponding with the target device preferences and a data signature of the tracker device included in at least one of the one or more direction finding request packets; and
receiving by the tracker device from the target device, one or more Bluetooth LE advertising packets, including a packet type indication that the packet is a direction finding packet, the packet including a data signature of the target device and direction finding data for at least one of an angle of arrival of angle (AoA) and angle of departure (AoD) estimation of the packet.

8. The method of claim 7, further comprising:
receiving in the transmitted one or more Bluetooth LE advertising packets, a request for data signing by tracker devices.

9. An apparatus, comprising:
at least one processor;
at least one memory including computer program code;
the at least one memory and the computer program code to, with the at least one processor, cause the apparatus at least to:
receive information in one or more Bluetooth LE advertising packets from a target device, including preferences of the target device for data signing associated with direction finding;
transmit to the target device, one or more direction finding request packets including a request for data signing corresponding with the target device preferences and a data signature of the tracker device included in at least one of the one or more direction finding request packets; and
receive from the target device, one or more Bluetooth LE advertising packets, including a packet type indication that the packet is a direction finding packet, the packet including a data signature of the target device and direction finding data for at least one of an angle of arrival of angle (AoA) and angle of departure (AoD) estimation of the packet.

10. The apparatus of claim 9, wherein
the at least one memory and the computer program code to, with the at least one processor, further cause the apparatus at least to:
receive in the transmitted one or more Bluetooth LE advertising packets, a request for data signing by tracker devices.

11. A computer program product comprising computer executable program code recorded on a computer readable non-transitory storage medium, the computer executable program code when executed, performing steps comprising:
receiving by a tracker device, information in one or more Bluetooth LE advertising packets from a target device, including preferences of the target device for data signing associated with direction finding;
transmitting by the tracker device to the target device, one or more direction finding request packets including a request for data signing corresponding with the target device preferences and a data signature of the tracker device included in at least one of the one or more direction finding request packets; and
receiving by the tracker device from the target device, one or more Bluetooth LE advertising packets, including a packet type indication that the packet is a direction finding packet, the packet including a data signature of the target device and direction finding data for at least one of an angle of arrival of angle (AoA) and angle of departure (AoD) estimation of the packet.

12. The computer program product of claim 11, further comprising computer executable program code recorded on a computer readable non-transitory storage medium, the computer executable program code when executed, performing steps comprising:

receiving in the transmitted one or more Bluetooth LE advertising packets, a request for data signing by tracker devices.

* * * * *